(12) United States Patent
Zhang et al.

(10) Patent No.: US 12,298,434 B2
(45) Date of Patent: May 13, 2025

(54) INTRA-VEHICLE RADAR HANDOVER

(71) Applicant: QUALCOMM Incorporated, San Diego, CA (US)

(72) Inventors: Dan Zhang, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/244,274

(22) Filed: Apr. 29, 2021

(65) Prior Publication Data
US 2022/0349997 A1    Nov. 3, 2022

(51) Int. Cl.
G01S 7/41 (2006.01)
G01S 13/34 (2006.01)
G01S 13/42 (2006.01)
G01S 13/87 (2006.01)
G01S 13/931 (2020.01)

(52) U.S. Cl.
CPC .............. *G01S 7/415* (2013.01); *G01S 13/34* (2013.01); *G01S 13/42* (2013.01); *G01S 13/878* (2013.01); *G01S 13/931* (2013.01); *G01S 2013/93271* (2020.01); *G01S 2013/93272* (2020.01); *G01S 2013/93274* (2020.01)

(58) Field of Classification Search
None
See application file for complete search history.

(56) References Cited

U.S. PATENT DOCUMENTS

| | | | | |
|---|---|---|---|---|
| 2011/0018755 | A1* | 1/2011 | Kikuchi | G01S 13/584 |
| | | | | 342/109 |
| 2012/0109538 | A1* | 5/2012 | Covello | F41G 7/2253 |
| | | | | 702/33 |
| 2014/0142800 | A1* | 5/2014 | Zeng | G06F 11/3055 |
| | | | | 701/30.6 |
| 2014/0285372 | A1* | 9/2014 | Kambe | G01S 13/5244 |
| | | | | 342/27 |
| 2018/0232947 | A1* | 8/2018 | Nehmadi | G01S 7/295 |
| 2018/0270727 | A1* | 9/2018 | Kim | H04W 36/0009 |
| 2019/0377086 | A1* | 12/2019 | Rogan | G01S 13/723 |
| 2020/0064483 | A1* | 2/2020 | Li | G01S 13/867 |
| 2020/0191942 | A1* | 6/2020 | Han | G01S 13/931 |
| 2021/0003665 | A1* | 1/2021 | Laddha | G01S 13/9011 |
| 2021/0156990 | A1* | 5/2021 | Madhow | G01S 13/42 |
| 2021/0255307 | A1* | 8/2021 | Bongio | G01S 13/726 |
| 2022/0099817 | A1* | 3/2022 | Crouch | G01S 13/426 |

* cited by examiner

*Primary Examiner* — Marcus E Windrich
(74) *Attorney, Agent, or Firm* — Holland & Hart LLP

(57) ABSTRACT

Methods, systems, and devices for wireless communications are described. A user equipment (UE), such as a vehicle that is enabled with radar detection and ranging, may include multiple radars or radar components and may receive, at a first radar, a first radar waveform in a field of view (FOV) associated with the first radar. The UE may determine a trajectory of the target object which may indicate the target object entering a FOV of a second radar. The UE may receive, at the second radar, a second radar waveform in the FOV of the second radar and may associate the second radar waveform with the target object based on the trajectory of the target object and the second radar waveform being in the FOV of the second radar.

26 Claims, 12 Drawing Sheets

INTRA-VEHICLE RADAR HANDOVER

FIELD OF TECHNOLOGY

The following relates to wireless communications, including intra-vehicle radar handover.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

In some wireless communications systems, a wireless device, such as a user equipment (UE) (e.g., a vehicle UE (VUE)), may include multiple radar components, such as radar transceivers, that each transmit radar signaling. For example, each radar component may transmit radio frequency signaling to track potential targets within a respective field of view (FOV). The radar components, however, may not be capable of sharing tracking information, which may lead to inefficient target tracking or detection (e.g., in cases where a target object moves from one FOV to another).

The described techniques relate to improved methods, systems, devices, and apparatuses that support intra-vehicle radar handover. Generally, the described techniques relate to an handover procedure at a user equipment (UE), such as a vehicle UE), for target detection and ranging, which may reduce signaling overhead and reduce latency for target detection in multi-radar systems that are supported by a vehicle UE. For example, a first radar component of the vehicle UE may transmit radar signaling and may receive reflected radar signaling to determine motion data (e.g., direction of motion, velocity, acceleration, location information, or the like) of a target object within a field of view (FOV) of the first radar component. In some cases, a tracked target may exit the FOV of the first radar component, and the vehicle UE may use the determined target motion data to predict the trajectory or other future motion data of the target relative to the vehicle UE, a FOV of the vehicle UE, or relative to a global frame of reference. In some cases, the vehicle UE may predict the entrance of the target into a FOV of a second radar component of the vehicle UE. In such cases, the second radar component may detect a target and determine whether it is the same target detected by the first radar component. For example, the second radar component may use the target motion data and the predicted target trajectory (e.g., from a shared information hub or database that may accessible by one or more other radar components or systems of the vehicle UE to use and store motion data or other tracking information for targets) to track the target as the target moves in the FOV of the second radar component. Such techniques may reduce the number of measurements to redetect the target (e.g., by enabling the second radar system to associate the target with historical data), reduce the latency for detecting a target as the target exits one FOV and enters another FOV, and may improve the likelihood and accuracy of redetecting the target.

A method is described. The method may include receiving, at a first radar component of the vehicle user equipment (UE), a first radar waveform in a field of view of the first radar component, where the first radar waveform indicates a set of motion parameters for a target object, determining a trajectory of the target object based on the set of motion parameters for the target object and the target object exiting the field of view of the first radar component, where the trajectory indicates the target object entering a field of view of a second radar component of the vehicle UE, receiving, by the second radar component of the vehicle UE, a second radar waveform in the field of view of the second radar component, and associating the second radar waveform with the target object based on the trajectory of the target object and the second radar waveform being in the field of view of the second radar component.

An apparatus is described. The apparatus may include a processor, memory coupled with the processor, and instructions stored in the memory. The instructions may be executable by the processor to cause the apparatus to receive, at a first radar component of the vehicle UE, a first radar waveform in a field of view of the first radar component, where the first radar waveform indicates a set of motion parameters for a target object, determine a trajectory of the target object based on the set of motion parameters for the target object and the target object exiting the field of view of the first radar component, where the trajectory indicates the target object entering a field of view of a second radar component of the vehicle UE, receive, by the second radar component of the vehicle UE, a second radar waveform in the field of view of the second radar component, and associate the second radar waveform with the target object based on the trajectory of the target object and the second radar waveform being in the field of view of the second radar component.

Another apparatus is described. The apparatus may include means for receiving, at a first radar component of the vehicle UE, a first radar waveform in a field of view of the first radar component, where the first radar waveform indicates a set of motion parameters for a target object, means for determining a trajectory of the target object based on the set of motion parameters for the target object and the target object exiting the field of view of the first radar component, where the trajectory indicates the target object entering a field of view of a second radar component of the vehicle UE, means for receiving, by the second radar component of the vehicle UE, a second radar waveform in the field of view of the second radar component, and means for associating the second radar waveform with the target object based on the trajectory of the target object and the second radar waveform being in the field of view of the second radar component.

A non-transitory computer-readable medium storing code is described. The code may include instructions executable by a processor to receive, at a first radar component of the vehicle UE, a first radar waveform in a field of view of the first radar component, where the first radar waveform indicates a set of motion parameters for a target object, determine a trajectory of the target object based on the set of motion parameters for the target object and the target object exiting the field of view of the first radar component, where the trajectory indicates the target object entering a field of view of a second radar component of the vehicle UE, receive, by the second radar component of the vehicle UE, a second radar waveform in the field of view of the second radar component, and associate the second radar waveform with the target object based on the trajectory of the target object and the second radar waveform being in the field of view of the second radar component.

Some examples of the method, apparatuses, and non-transitory computer-readable medium described herein may further include operations, features, means, or instructions for generating a radar image spectrum based on the second radar waveform, the radar image spectrum including a range spectrum, a Doppler spectrum, a direction of arrival spectrum, or any combination thereof and associating a set of radar image coordinates of the radar image spectrum with the target object based on the trajectory and the second radar spectrum.

Some examples of the method, apparatuses, and non-transitory computer-readable medium described herein may further include operations, features, means, or instructions for determining a second set of motion parameters for the target object in the field of view of the second radar component based on the second radar waveform and the set of radar image components.

In some examples of the method, apparatuses, and non-transitory computer-readable medium described herein, determining the trajectory of the target object may include operations, features, means, or instructions for generating a radar image spectrum based on the first radar waveform, the radar image spectrum including a range spectrum, a Doppler spectrum, a direction of arrival spectrum, or any combination thereof, determining a set of radar image coordinates of the radar image spectrum based on the first radar waveform and the radar image spectrum, and determining the set of motion parameters for the target object based on the set of radar image coordinates, the set of motion parameters including a velocity of the target object, a direction of arrival of the target object, a range of the target object, or a combination thereof.

In some examples of the method, apparatuses, and non-transitory computer-readable medium described herein, determining the trajectory of the target object may include operations, features, means, or instructions for determining the trajectory based on a set of tracking data for the target object, where the set of tracking data may be based on one or more previous radar waveforms received at the first radar component.

Some examples of the method, apparatuses, and non-transitory computer-readable medium described herein may further include operations, features, means, or instructions for receiving a third radar waveform in the field of view of the first radar component and determining a second set of radar image coordinates of the radar image spectrum based on the third radar waveform and the radar image spectrum, where the trajectory may be determined based on the first and second sets of radar image coordinates.

Some examples of the method, apparatuses, and non-transitory computer-readable medium described herein may further include operations, features, means, or instructions for storing measurements associated with the first radar waveform on a database associated with the vehicle UE and accessing, by the second radar component, the measurements on the database, where the second radar waveform may be associated with the target object based on the accessed measurements.

Some examples of the method, apparatuses, and non-transitory computer-readable medium described herein may further include operations, features, means, or instructions for transmitting, by the first radar component of the vehicle UE, a first frequency modulated continuous wave, where the first radar waveform includes the first frequency modulated continuous wave reflected by the target object and transmitting, by the second radar component of the vehicle UE, a second frequency modulated continuous wave, where the second radar waveform includes the second frequency modulated continuous wave reflected by the target object.

In some examples of the method, apparatuses, and non-transitory computer-readable medium described herein, each of the first frequency modulated continuous wave and the second frequency modulated continuous wave may be associated with a set of radar transmission parameters.

In some examples of the method, apparatuses, and non-transitory computer-readable medium described herein, the set of radar transmission parameters includes a slope, a start frequency, a time offset, a chirp duration, a frequency offset, a number of frequency chirps, or any combination thereof.

Some examples of the method, apparatuses, and non-transitory computer-readable medium described herein may further include operations, features, means, or instructions for predicting a set of coordinates corresponding to the target object entering the field of view of the second radar component based on the trajectory and determining a set of uncertainty measurements associated with the set of coordinates, where the second radar waveform may be associated with the target object based on the set of uncertainty measurements.

In some examples of the method, apparatuses, and non-transitory computer-readable medium described herein, each of the first radar waveform and the second radar waveform includes a frequency modulated continuous wave.

In some examples of the method, apparatuses, and non-transitory computer-readable medium described herein, the trajectory indicates a set of future motion parameters associated with the target object.

DETAILED DESCRIPTION

Figure 1:
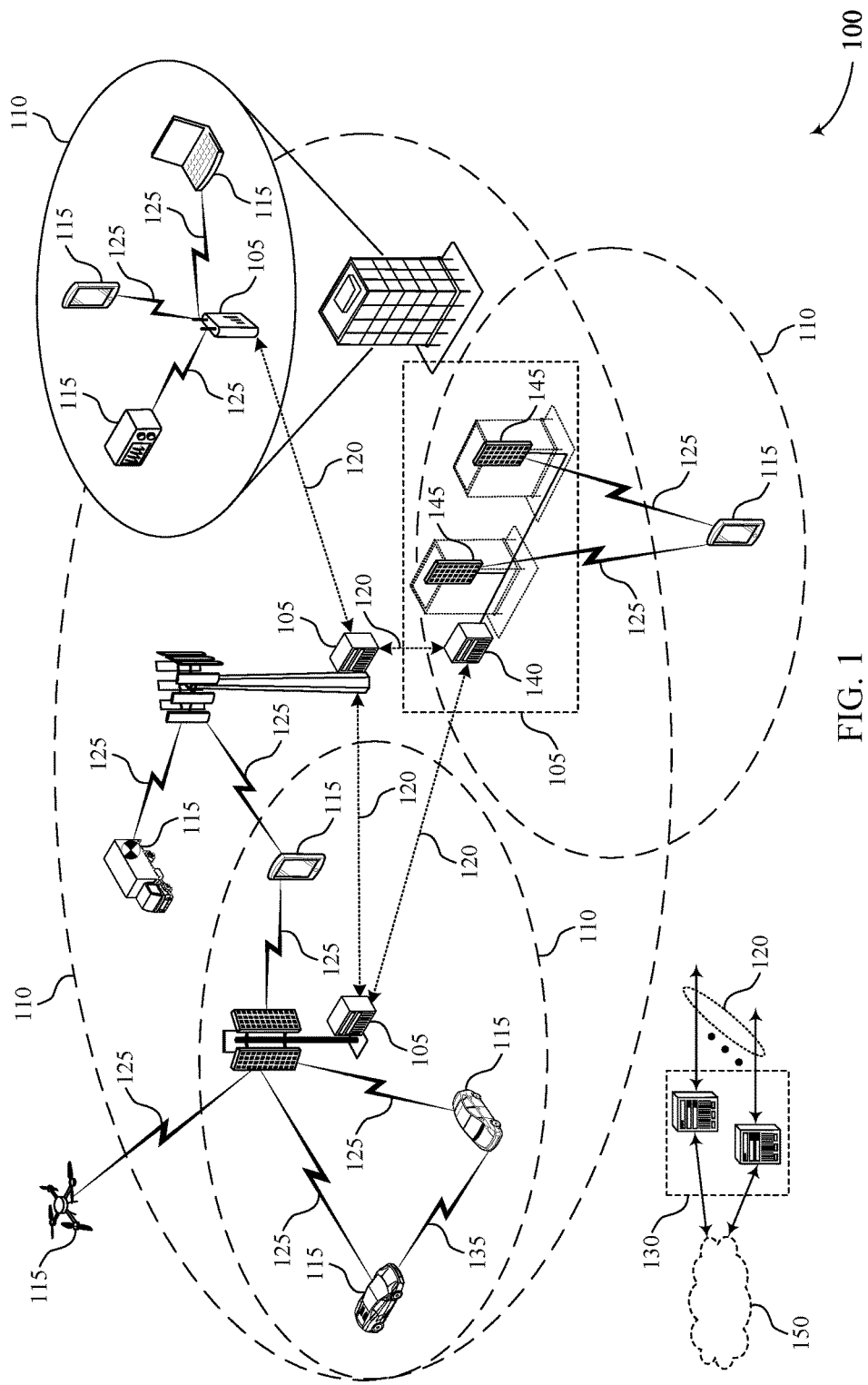
FIG. 1 illustrates an example of a wireless communications system that supports intra-vehicle radar handover in accordance with aspects of the present disclosure.

In some wireless communications systems, radio frequency signaling, such as radar signaling, (e.g., Frequency Modulated Continuous Wave (FMCW) radar, Phase Modulated Continuous Wave (PMCW) radar, or the like) may be implemented in a wide range of applications including vehicle ranging for target detection and the like. In some examples, radar signaling may be employed by a user equipment (UE) such as a vehicle UE, which may operate in a full duplex mode supporting simultaneous uplink and downlink transmissions in a same time period. For example, vehicle UEs may transmit radar signaling to detect potential targets and avoid collisions with a detected target (or for making other vehicle based decisions such a maneuverability or operations). In some cases, a vehicle UE may transmit radar signaling by multiple radar components of the vehicle UE to increase a detection range, which may result in the measurement and detection of a single target by multiple components of the UE.

In some cases, a target may move from a first field of view (FOV) of a first radar component of a vehicle UE to a second FOV associated with a second radar component of the vehicle UE. In such cases, the vehicle UE may detect the same target by different radar component at different times. However, the individual radar components may not be enabled to coordinate tracking of the target, thus resulting in redetection and retracking by each radar component that may detect or attempt to detect the target. Redundant measurements may, in some cases, reduce the efficiency and accuracy of target detection at the vehicle UE by one or more radar components of the vehicle UE.

The present disclosure provides techniques for improving target tracking efficiency and accuracy by supporting a handover procedure of target detecting and tracking data between radar components of a vehicle UE. A first radar component of a vehicle UE may transmit radar signaling and may receive reflected radar signaling from a target. The first radar component may detect the target and track its motion while within a first FOV associated with the first radar component and may generate a radar image based on the target tracking information (e.g., position, direction of motion, velocity, turning information, or the like). The target may exit the first FOV and the first radar component (or another component of a radar system of the vehicle UE that supports operations for the first radar component) may calculate (e.g., predict) a trajectory (e.g., a path of future motion) of the target relative to the vehicle UE, one or more FOVs of the vehicle UE, or a global frame of reference. For example, the vehicle UE may predict the coordinates at which the target may appear in a FOV of, or an associated radar image generated by, a second radar component. The vehicle UE may store the target motion information, as well as any determined characteristics of the target and the predicted target trajectory at a centralized entity (e.g., a central node or database of the vehicle UE that may be accessible by one or more radar components of the vehicle UE) of the vehicle UE. The centralized entity may, for example, be in communication with the first radar component or the second radar component, or both, as well as any other radar components of the vehicle UE.

In some cases, the target may exit the first FOV. The first radar system may transmit or otherwise store the tracking information of the target to the central entity. The second radar system may access the tracking information of the target and the predicted target trajectory via the central entity. The vehicle UE may use the predicted trajectory of the target to determine if and when the target may enter the second FOV. The vehicle UE may determine the predicted coordinates of the target based on the generated radar image (e.g., which may include range, doppler, direction of arrival (DoA) frequency spectrums, or the like). The second radar component may use the predicted entry coordinates of the target to enable more efficient tracking of the target as the target enters the second FOV.

In some cases, the second radar system may reduce the number of measurements to redetect the target by using the measurement information detected at the first radar system or the predicted trajectory of the target based on the measurements at the first radar system. By using previous tracking information in conjunction with tracking information at the second radar system, the vehicle UE may also establish continuous tracking information for one target across multiple FOVs of multiple radar systems. The vehicle UE may be better equipped to respond to environmental factors (e.g., targets) with more comprehensive information about target motion associated with multiple FOVs.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to intra-vehicle radar handover.

FIG. 1 illustrates an example of a wireless communications system 100 that supports intra-vehicle radar handover in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit or receive radar signaling in full duplex mode in a wide range of applications including vehicle ranging for target detection and the like. For example, a UE 115 may receive, at a first radar component of the UE 115, a first radar waveform in an FOV associated with the first radar component, where the first radar waveform may indicate a set of motion parameters for a target such as another vehicle, a person, or a moving object, among other examples. In some examples, the set of motion parameters may include a velocity of the target, a direction of arrival of the target, a range of the target, or any combination thereof.

The UE 115 may determine a trajectory of the target based on the set of motion parameters for the target and based on the target exiting the field of view of the first radar component. In some examples, the trajectory may indicate the target object entering an FOV of a second radar component of the UE 115 and, in some examples, may indicate a set of future motion parameters associated with the target. The UE 115 may receive, at the second radar component of the UE 115, a second radar waveform in the FOV of the second radar component and may associate the second radar waveform with the target based on the trajectory of the target and the second radar waveform being in the FOV of the second radar component.

In some examples, the UE 115 may generate a radar image spectrum based on the second radar waveform. The radar image spectrum may include a range spectrum, a Doppler spectrum, a direction of arrival spectrum, or any combination thereof. The UE 115 may associate a set of radar image coordinates of the radar image spectrum with the target based on the trajectory and the second radar spectrum. As such, the UE 115 may increase efficiency by associating target information detected by the first radar component with a target detected by the second radar component and may be more readily able to identify a target moving between FOVs of the UE 115 within the wireless communications system 100.

Figure 2:
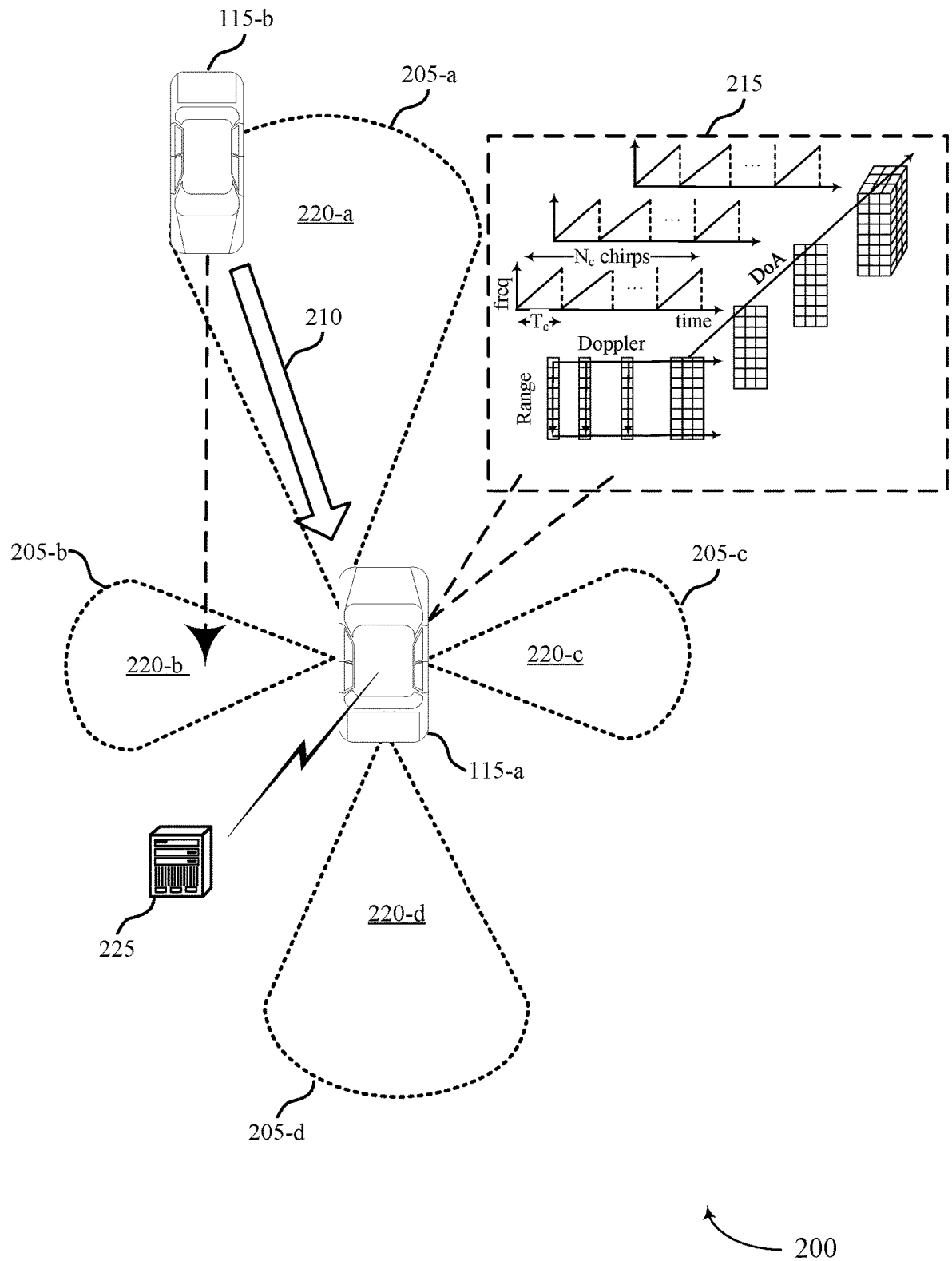
FIG. 2 illustrates an example of a wireless communications system that supports intra-vehicle radar handover in accordance with aspects of the present disclosure.

FIG. 2 illustrates an example of a wireless communications system 200 that supports intra-vehicle radar handover in accordance with aspects of the present disclosure. In some examples, the wireless communications system 200 may implement aspects of the wireless communications system 100. For instance, the wireless communications system 200 includes UE 115-*a* and UE 115-*b*, which may be examples of a UE 115 as described with reference to FIG. 1. In some examples, the UE 115-*a* in the wireless communications system 200 may implement communications as part of a handover procedure for target detection and tracking between radar components of the UE 115-*a* to support increased tracking efficiency and accuracy.

The UE 115-*a* may transmit radar signaling 205-*a*, 205-*b*, 205-*c*, and 205-*d* each from a respective radar component of the UE 115-*a*. In some cases, the radar signaling 205-*a* 205-*b*, 205-*c*, and 205-*d* may be radar signaling such as FMCW signaling or PMCW signaling), which may support various functionalities, including, for example, target ranging, environmental and object detection, and target tracking among other examples. A first radar component of the UE 115-*a* may transmit the radar signaling 205-*a* within a FOV 220-*a* of the first radar component. In some examples, the first radar component may be located, for example, on a side or roof of the UE 115-*a* and may support radar ranging and detection within the FOV 220-*a*. The first radar component may, in some cases, receive reflected radar signaling 210 from a target UE 115-*b* which may be an example of a vehicle UE or other target object such as a pedestrian, bicycle, road side unit (RSU), or the like. The first radar component may detect the target UE 115-*b* based on the reflected radar signaling 210 and may track the target UE 115-*b* as target UE 115-*b* moves through or within the FOV 220-*a* of the first radar component. The target UE 115-*b* may be considered to be within a FOV 220-*a* of the first radar component based on the target UE 115-*a* receiving reflected radar signaling 210 from the target UE 115-*b*. Similarly, the target UE 115-*b* may be considered to be in a second FOV 220-*b* if the UE 115-*a* receives reflected radar signaling transmitted by a radar component associated with the second FOV 220-*b*, and so on for any additional radar components that support radar ranging and detection for FOVs 220-*c* and 220-*d*.

The UE 115-*a* may concurrently or subsequently transmit and receive the radar signaling 205-*b*, 205-*c*, and 205-*d* from one or more additional radar components of the UE 115-*a*. While the UE 115-*a* is depicted as transmitting radar signaling 205-*a*, 205-*b*, 205-*c*, and 205-*d* from a number of radar components respectively, it is to be understood that such an example is not intended to be limiting and the UE 115-*a* may include any number of radar components for transmitting radar signaling 205. Each additional radar component may also detect and track targets based on reflected radar signaling 210 within respective FOVs 220. By transmitting radar signaling 205 from multiple radar components, the UE 115-*a* may increase a target detection range. However, in some cases, the UE 115-*a* may perform multiple tracking and detection measurements of the same target if the target is within or projected to be within one or more of the multiple FOVs 220 of the UE 115-*a* radar components. For example, if the target UE 115-*b* exits the FOV 220-*a* of the first radar component (e.g., the range of the radar signaling 205-*a*) to an FOV 220-*b* of the second radar component (e.g., the range of the radar signaling 205-*b*), the second radar component may interpret the target UE 115-*b* as a new target and repeat measurements or may repeat a target locking procedure already completed by the first radar component. To improve tracking efficiency and accuracy, the UE 115-*a* may perform a handover procedure from the first radar component to the second radar component, which may involve the exchange of the target detecting and tracking data between the first and second radar components of the UE 115-*a* as the target moves from the FOV 220-*a* of the first radar component to the FOV 220-*b* of the second radar component, which may enable the second radar component to detect the target UE 115-*b* more efficiently.

In some cases, the UE 115-*a* may generate a radar image 215 based on the target tracking information (e.g., position, direction of motion, velocity, turning information, or the like) of the target UE 115-*b*. The UE 115-*a* may determine the target tracking information of the UE 115-*a* based on the reflected radar signaling 210. The UE 115-*a* may use the radar image 215 to calculate or predict a trajectory of the target UE 115-*b* relative to the UE 115-*a* or a global frame of reference. The UE 115-*a* may store the target tracking information, as well as the calculated trajectory and any other determined characteristics regarding the motion of the target UE 115-*b* at a central entity 225 of the UE 115-*a* (e.g., a database, a centralized processing unit, or the like), which may be a component of the UE 115-*a* or otherwise accessible by the UE 115-*a* and one or more radar components of the UE 115-*a*. In some cases, other radar components of the UE 115-*a* may similarly generate radar images based on any target(s) tracked within respective FOVs 220.

In some cases, the radar signaling 205-*a* may include a number of "chirps" (e.g., periodic FMCWs sweeping in frequency over a defined frequency range) where each chirp may be associated with a number of transmission parameters including a slope, a start frequency, a time offset, a chirp duration or period (represented by $T_c$ and may include a duration associated with the reflection of a given chirp), a frequency offset, a number of frequency chirps (represented by $N_c$), or any combination thereof. If the chirps are reflected by the target UE 115-*b*, the first radar component at the UE 115-*a* may receive the reflected chirps (e.g., the reflected FMCW waveform) after a delay (e.g., a phase shift). The delay of the received chirps relative to the transmitted chirps may be proportional to the range (e.g., the distance from the first radar component to the target UE 115-*b*). The UE 115-*a* may combine the radar signaling 205-*a* with the received reflected radar signal to produce a composite signal with a distinct beat frequency. The beat frequency may be a function of the delay (e.g., correlated with the distance of the target UE 115-*b* to the UE 115-*a*). Thus, the UE 115-*a* may use the beat frequencies of radar signaling 205-*a* chirps to identify a range spectrum for target detection. In some cases, using the data from multiple successive chirps, the first radar component may calculate a Doppler spectrum to identify the velocity of the target UE 115-*b*. In some cases, using the data from multiple chirps over multiple antennas, the first radar component may calculate a DoA spectrum to identify the direction of motion of the target UE 115-*b*.

In some cases, the UE 115-*a* may generate a radar image 215 that may include the processed data relating to the radar signaling 205-*a* and the reflected radar signaling 210. For example, the radar image 215 may include the range spectrum based on the beat frequencies. The radar image 215 may include the Doppler spectrum based on changes in phase of the received reflected signals over a series of multiple successive chirps. The radar image 215 may include the DoA spectrum based on the angles of incidence of the received signals at multiple antennas. In the radar image 215, the UE 115-*a* may identify the target UE 115-*b* based on a peak in the range spectrum, the Doppler spectrum, and/or the DoA spectrum. The coordinate system of the radar image 215 (e.g., including the range, Doppler, DoA) may be based on position and time information of the target UE 115-*b*. The information included in the radar image 215 may enable the UE 115-*a* to track the target UE 115-*b* within or through the FOV 220-*a* of the first radar component. In some examples, the UE 115-*a* may predict or calculate a trajectory (e.g., future location, DoA, velocity) of the target ULE 115-*b* based on the radar image 215, which may indicate a set of future motion parameters associated with the motion of the target UE 115-*b*.

Other radar components of the UE 115-*a* may similarly generate radar images. The UE 115-*a* may store all generated radar images at a central entity 225 accessible to all or a subset of the radar components. The UE 115-*a* may additionally store any predicted trajectories of targets (e.g., based on the radar image 215 at the central entity 225). Thus, the second radar component may access the radar image 215 generated by the first radar component, or the predicted trajectory of a target, or both. For example, the second radar component may access the predicted trajectory of the target UE 115-*b*, based on the radar image 215 generated by the first radar component. The predicted trajectory of the target UE 115-*b* may include one or more of a time, a point, or a velocity of entry into the FOV 220-*b* of the second radar component. The second radar component may use the predictions to identify a detected target as the target UE 115-*b* which may reduce processing or measurements performed at the second radar component to redetect the target UE 115-*b* as it moves into the second FOV 220-*b*. For example, the UE 115-*a* may predict a set of coordinates (e.g., location, time) in a radar image generated by the second radar component that correspond to the target UE 115-*b* as it moving into the second FOV 220-*b* and in some examples may calculate an uncertainty associated with the predicted set of coordinates. The UE 115-*a* may also use the radar images generated by both the first radar component and the second radar component to identify a continuous path of the target UE 115-*b* relative to the UE 115-*a*. Thus, the UE 115-*a* may improve the efficiency and accuracy of target tracking by implementing a handover of the tracking data between radar components.

Figure 3:
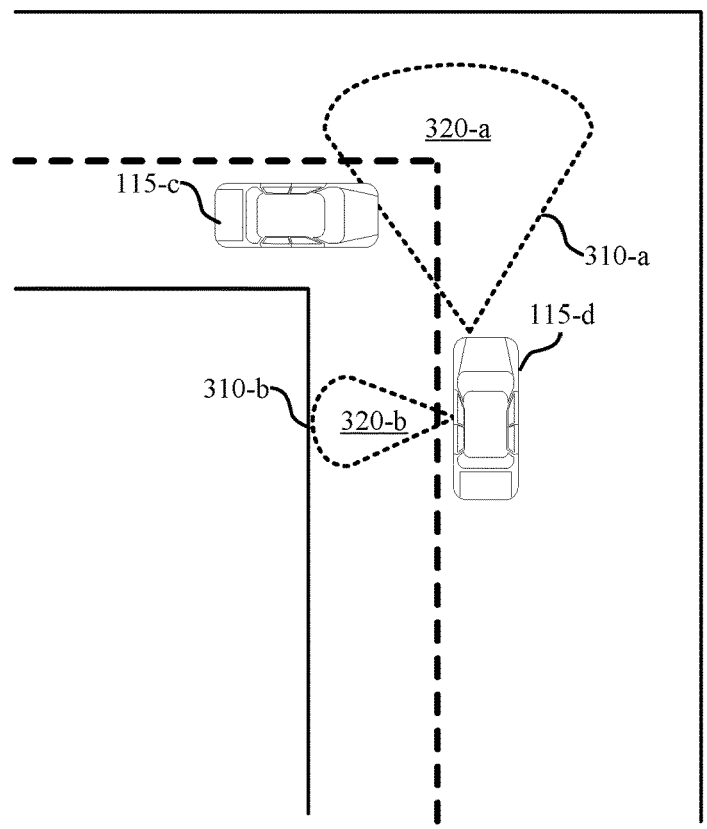
FIG. 3 illustrate an example of a wireless communications system that supports intra-vehicle radar handover in accordance with aspects of the present disclosure.
Figure 3:
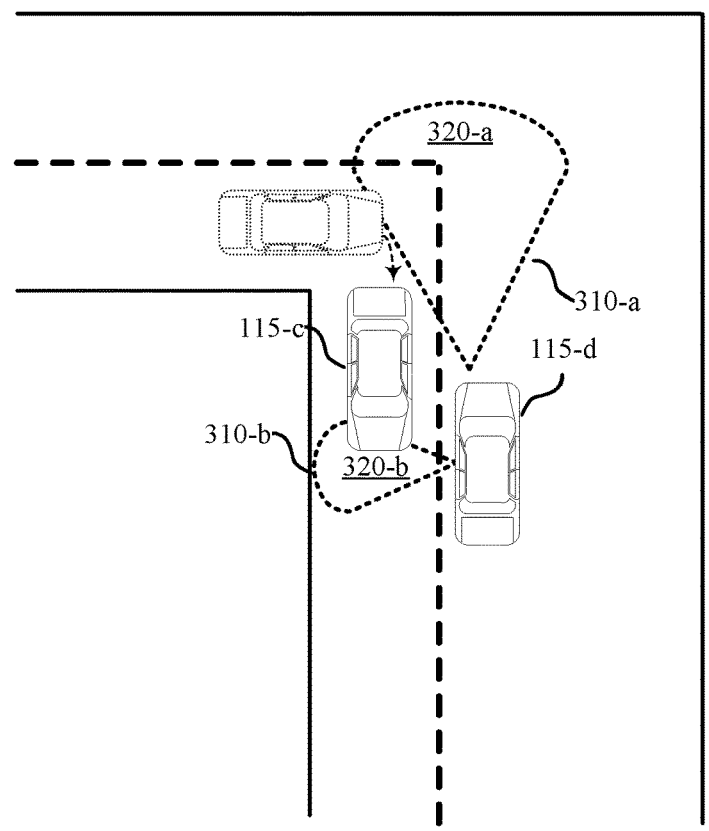

FIG. 3 illustrates an example of a wireless communications system 300 that supports intra-vehicle radar handover in accordance with aspects of the present disclosure. In some examples, the wireless communications system 300 may implement aspects of the wireless communications systems 100 or 200. For example, UEs operating in the wireless communications system 300 may perform a handover procedure for detection and tracking data of a target that travels through or within a first FOV 320-*a* associated with a first radar component and a second FOV 320-*b* associated with a second radar component. The wireless communications system 300 may include one or more vehicles (e.g., a UE 115-*c*, a UE 115-*d*) that may travel in various directions or lanes of a roadway. The UEs 115-*c* and 115-*d* may support intra-UE target detection and ranging handover between radar components in accordance with aspects of the present disclosure.

The UE 115-*d* may include one or more radar transmitters which may transmit long-range radar (LRR), mid-range radar (MRR), or short-range radar (SRR). For example, a transmitter on a frontside of a vehicle may transmit LRR, a transmitter on a backside of a vehicle may transmit MRR while a transmitter on a left or right side of a vehicle UE may transmit SRR. In some examples, the UE 115-*d* may transmit radar signaling 310-*a* (e.g., LRR) via a first radar component and radar signaling 310-*b* (e.g., SRR) via a second radar component to support various functionalities of the UE 115-*d* (e.g., target tracking for environmental and object detection, among other examples) while in operation. It is to be understood that the UE 115-*d* may transmit additional radar signaling from one or more other radar components. Based on the local geometry of the roadway, the UEs 115-*c* and 115-*d* may pass each other such that the UE 115-*c* may pass through both a first FOV 320-*a* associated with radar signaling 310-*a* and a second FOV 320-*b* associated with radar signaling 310-*b*. For example, the UE 115-*d* may detect the UE 115-*c* based on the radar signaling 310-*a* as the UE 115-*c* passes travels through or within the FOV 320-*a* of the first radar component (e.g., the FOV 320-*a* associated with the radar signaling 310-*a*). As the UE 115-*c* turns the corner of the roadway, the UE 115-*c* may exit the first FOV 320-*a* and enter the FOV 320-*b* of the second radar component (e.g., the FOV associated with the radar signaling 310-*b*). In some examples, the second radar component of the UE 115-*d* may access the tracking information gathered by the first radar component of the UE 115-*d* via a central data storage location. The second radar component may use the tracking information to determine a re-entry point of the UE 115-*c*. For example, The UE 115-*d* may detect a target based on transmitting the radar signaling 310-*b* and may identify that the target is the UE 115-*c* based on the tracking information collected by the first radar component. Thus, the UE 115-*d* may reduce overhead used to identify the UE 115-*c* and may more accurately track the UE 115-*c* in the second FOV 320-*b* based on the additional historical data provided by the first radar component.

In some cases, the first radar component may determine vehicle motion data and maneuver information (e.g., position, velocity, turning information) regarding the UE 115-*c* in real-time (e.g., as the ULE 115-*c* navigates the roadway). While the UE 115-*c* moves through or within the FOV 320-*a* of the first radar component, the first radar component may collect target tracking data regarding the motion of the UE 115-*c*. Using both the vehicle motion data and the target motion data, the first radar component may calculate a predicted trajectory of the UE 115-*c* relative to the UE 115-*d* or relative to a global frame of reference. For example, if the UE 115-*c* exits the FOV 320-*a* of the first radar component, the UE 115-*d* may calculate the trajectory based on previous tracking data collected by the first radar component. In some examples, the UE 115-*d* may generate a radar images based on reflected radar signaling and may determine the future trajectory based on the radar image. In some examples, the UE 115-*d* generates a plurality of radar images as the UE 115-*c* travels through or within the first FOV 320-*a*.

The UE 115-*d* may use the calculated trajectory to determine an entry point in the second FOV 320-*b*. For example, the UE 115-*d* may predict a set of coordinates at which the UE 115-*c* will be detected (e.g., as a peak in the radar image) in future radar images when the UE 115-*c* enters the second FOV 320-*b*. In some cases, the UE 115-*d* may calculate a calculated uncertainty measurement associated with the trajectory or the set of coordinates of the radar image associated with the reentry point. If such predictions are correct or within a margin of error (e.g., a target is detected at the predicted set of coordinates), the UE 115-*d* may access the radar image data from the first radar component at a central location such as a central database and may associate the motion data of the UE 115-*c* collected by the first radar component with the target detected at the predicted set of coordinates. The second radar component may leverage predictions regarding the motion of the UE 115-*c* to facilitate more efficient re-locking and tracking of the target as it enters the second FOV 320-b.

Figure 4:
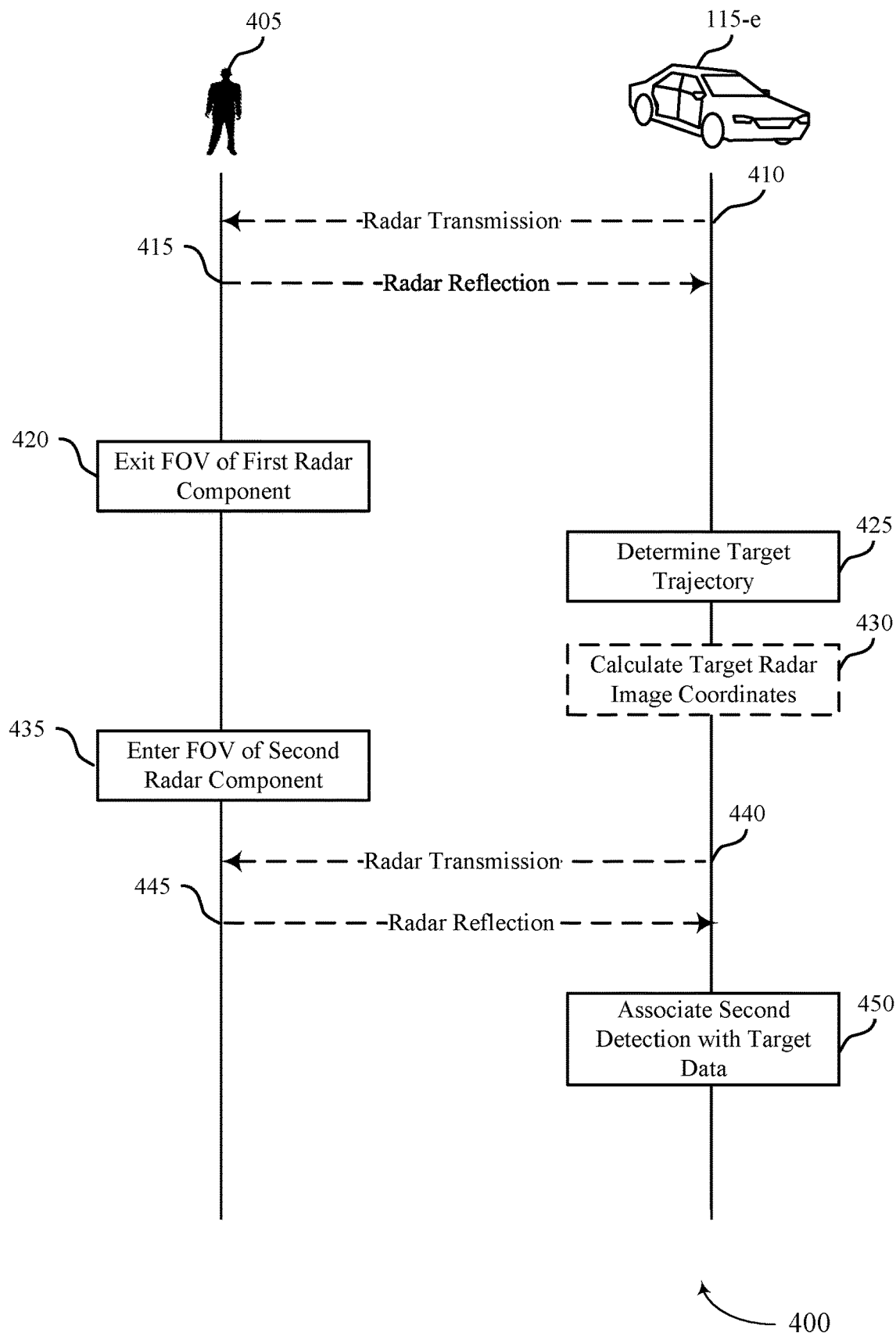
FIG. 4 illustrates an example of a process flow that supports intra-vehicle radar handover in accordance with aspects of the present disclosure.

FIG. 4 illustrates an example of a process flow 400 that supports intra-vehicle radar handover in accordance with aspects of the present disclosure. In some examples, the process flow 400 may implement aspects of wireless communications systems 100, 200, and/or 300. Process flow 400 includes a UE 115-e which may be an example of the corresponding device as described with reference to FIG. 1. Process flow 400 also includes a target 405.

In the following description of the process flow 400, the operations between the UE 115-e and the target 405 may be transmitted (e.g., transmitted from a UE 115 or reflected from the target 405) in a different order than the exemplary order shown, or operations performed by the UE 115-e may be performed in different orders, at different times, or by different entities. Certain operations may also be left out of the process flow 400, or other operations may be added to the process flow 400. It is to be understood that while the UE 115-e is shown performing a number of the operations of process flow 400, any wireless device may perform the operations shown. Process flow 400 may illustrate a handover procedure for target detection and tracking.

At 410, a first component of the UE 115-e may transmit radar signaling (e.g., FMCW) based on a FOV of the first radar component. For example, the UE 115-e may transmit a number of "chirps" constitute a periodic FMCWs at a frequency. At 415, the target 405 may reflect the radar signaling to the first radar component at the UE 115-e. For example, if the target 405 is within the FOV of the first radar component, the transmitted radar signaling may be reflected by the target. The UE 115-e may receive the reflected FMCW at the first radar component. Based on the phase difference between the transmitted FMCWs and the received FMCWs, the UE 115-e may determine target tracking information (e.g., position, direction of motion, velocity) of the target 405. The UE 115-e may track the target 405 as it moves through the FOV of the first radar component. The UE 115-e may store the tracking information at a central storage location (e.g., a computer or processor of the UE 115-e).

At 420, the target 405 may exit the FOV of the first radar component. For example, the target 405 may be in motion and may move out of range of radar signaling transmitted by the first radar component. In some cases, the target 405 may be stationary and the UE 115-e may move the FOV associated with the first radar component with respect to the target 405 such that the target 405 is no longer in the FOV associated with the first radar component. As the target 405 exits the FOV of the first radar component, the UE 115-e may lose track the target 405.

At 425, the UE 115-e may determine the trajectory of the target 405. In some cases, based on previous target tracking information, the UE 115-e may predict a future trajectory of the target 405. The UE 115-e may store the predicted trajectory at the central storage location to be accessed by one or more other radar components of the UE 115-e. In some cases, at 430, the UE 115-e may calculate the target tracking information in radar image coordinates. For example, the UE 115-e may generate a radar image and may predict a future location of the target 405 at a set of coordinates of a range spectrum, a Doppler spectrum, or a DoA spectrum, or some combination thereof. In some cases, the UE 115-e may also determine an uncertainty range for each coordinate.

At 435, the target 405 may enter the FOV of a second radar component of the UE 115-e. In some cases, the UE 115-e may predict that the target 405 may enter the FOV of the second radar component based on the determined target trajectory and/or the set of coordinates in the radar images.

At 440, the second radar component of the UE 115-e may transmit radar signaling. For example, the radar signaling (e.g., FMCW) may propagate within the FOV of the second radar component. The UE 115-e may transmit the radar signaling in chirps. In some cases, by using the predicted target trajectory as a guide, the UE 115-e may focus radar signaling on a specific area of interest within the FOV (e.g., at the predicted re-entry location, including an uncertainty threshold area). In some cases, at 445, the target 405 may reflect the radar signaling to the second radar component at the UE 115-e. For example, if the target 405 is within the FOV of the second radar component, it may reflect the radar signaling to the second radar component, however the second radar component may not initially identify the target detected by the second radar component as the same target that was detected by the first radar component.

At 450, the UE 115-e may associate the data collected by the first radar component with the target based on the second radar component detecting the target on the predicted trajectory or within a margin of error or the predicted trajectory. For example, based on the determined target trajectory and/or the radar images generated by the first radar component, the second radar component may determine that the target tracked within the FOV of the second radar component is the same target 405 as previously tracked in the FOV of the first radar component. As such, the UE 115-e may generate continuous tracking information for the target 405 across multiple FOVs of multiple radar components.

Figure 5:
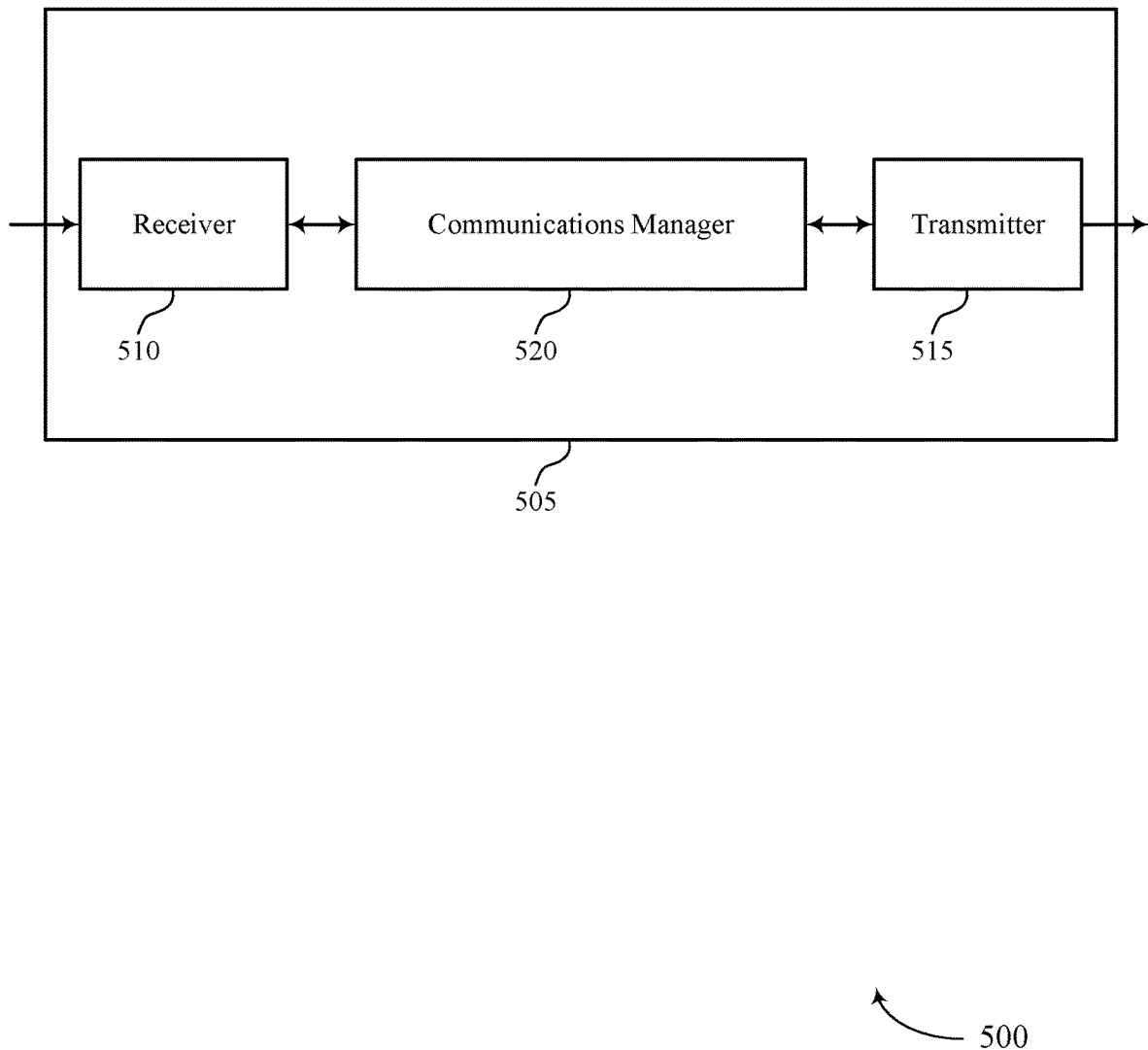
FIGS. 5 and 6 show block diagrams of devices that support intra-vehicle radar handover in accordance with aspects of the present disclosure.

FIG. 5 shows a block diagram 500 of a device 505 that supports intra-vehicle radar handover in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to intra-vehicle radar handover). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to intra-vehicle radar handover). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of intra-vehicle radar handover as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for receiving, at a first radar component of the vehicle UE, a first radar waveform in a field of view of the first radar component, where the first radar waveform indicates a set of motion parameters for a target object. The communications manager 520 may be configured as or otherwise support a means for determining a trajectory of the target object based on the set of motion parameters for the target object and the target object exiting the field of view of the first radar component, where the trajectory indicates the target object entering a field of view of a second radar component of the vehicle UE. The communications manager 520 may be configured as or otherwise support a means for receiving, at the second radar component of the vehicle UE, a second radar waveform in the field of view of the second radar component. The communications manager 520 may be configured as or otherwise support a means for associating the second radar waveform with the target object based on the trajectory of the target object and the second radar waveform being in the field of view of the second radar component.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and power consumption at the device 505, more efficient utilization of resources and improved detection for radar components of the device 505 through target tracking and handover of track information between radar components of the device 505.

Figure 6:
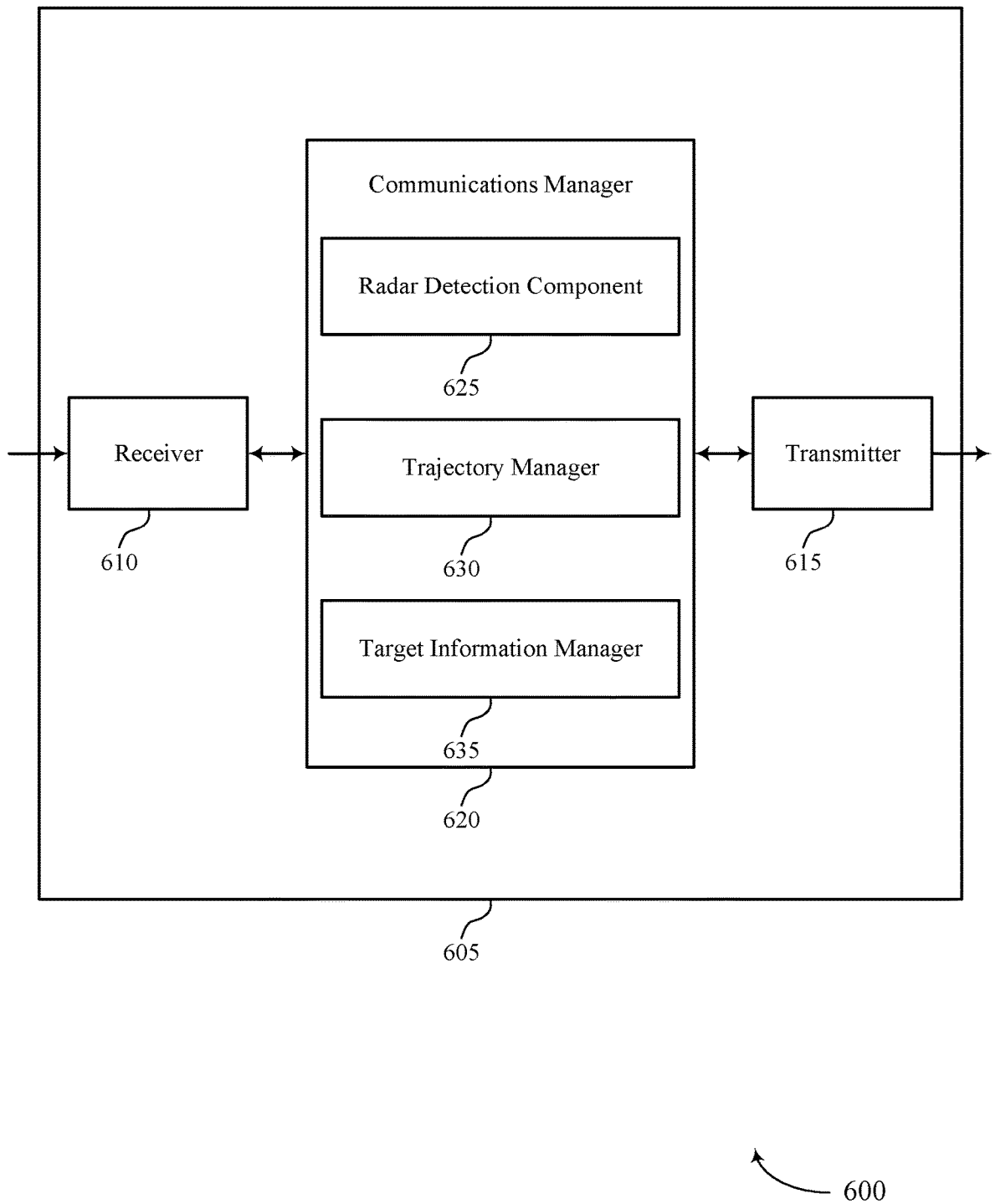

FIG. 6 shows a block diagram 600 of a device 605 that supports intra-vehicle radar handover in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to intra-vehicle radar handover). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to intra-vehicle radar handover). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of intra-vehicle radar handover as described herein. For example, the communications manager 620 may include a radar detection component 625, a trajectory manager 630, a target information manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The radar detection component 625 may be configured as or otherwise support a means for receiving, at a first radar component of the vehicle UE, a first radar waveform in a field of view of the first radar component, where the first radar waveform indicates a set of motion parameters for a target object. The trajectory manager 630 may be configured as or otherwise support a means for determining a trajectory of the target object based on the set of motion parameters for the target object and the target object exiting the field of view of the first radar component, where the trajectory indicates the target object entering a field of view of a second radar component of the vehicle UE. The radar detection component 625 may be configured as or otherwise support a means for receiving, at the second radar component of the vehicle UE, a second radar waveform in the field of view of the second radar component. The target information manager 635 may be configured as or otherwise support a means for associating the second radar waveform with the target object based on the trajectory of the target object and the second radar waveform being in the field of view of the second radar component.

Figure 7:
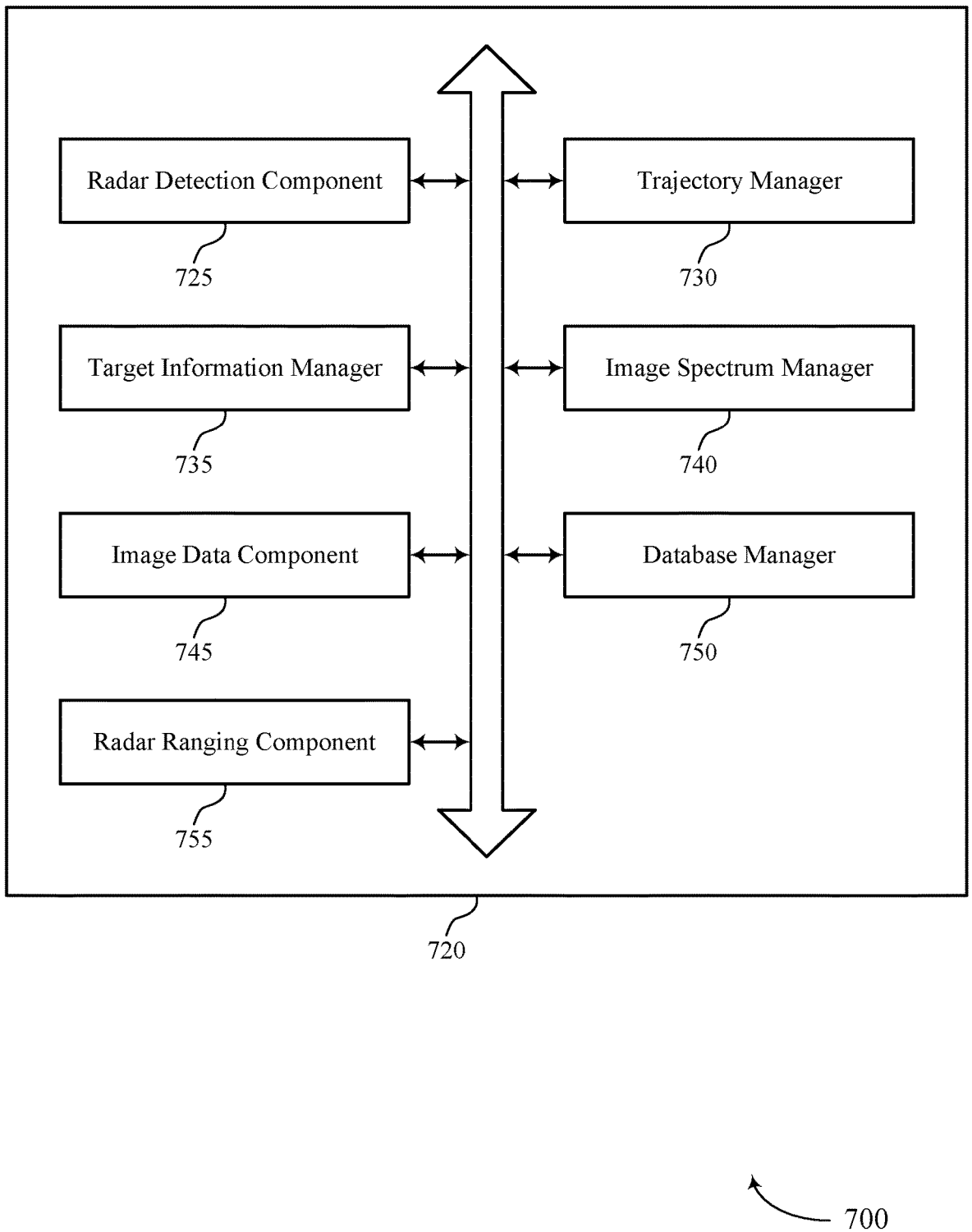
FIG. 7 shows a block diagram of a communications manager that supports intra-vehicle radar handover in accordance with aspects of the present disclosure.

FIG. 7 shows a block diagram 700 of a communications manager 720 that supports intra-vehicle radar handover in accordance with aspects of the present disclosure. The communications manager 720 may be an example of aspects of a communications manager 520, a communications manager 620, or both, as described herein. The communications manager 720, or various components thereof, may be an example of means for performing various aspects of intra-vehicle radar handover as described herein. For example, the communications manager 720 may include a radar detection component 725, a trajectory manager 730, a target information manager 735, an image spectrum manager 740, an image data component 745, a database manager 750, a radar ranging component 755, or any combination thereof. Each of these components may communicate, directly or indirectly, with one another (e.g., via one or more buses).

The radar detection component 725 may be configured as or otherwise support a means for receiving, at a first radar component of the vehicle UE, a first radar waveform in a field of view of the first radar component, where the first radar waveform indicates a set of motion parameters for a target object. The trajectory manager 730 may be configured as or otherwise support a means for determining a trajectory of the target object based on the set of motion parameters for the target object and the target object exiting the field of view of the first radar component, where the trajectory indicates the target object entering a field of view of a second radar component of the vehicle UE. In some examples, the radar detection component 725 may be configured as or otherwise support a means for receiving, at the second radar component of the vehicle UE, a second radar waveform in the field of view of the second radar component. The target information manager 735 may be configured as or otherwise support a means for associating the second radar waveform with the target object based on the trajectory of the target object and the second radar waveform being in the field of view of the second radar component.

In some examples, the image spectrum manager 740 may be configured as or otherwise support a means for generating a radar image spectrum based on the second radar waveform, the radar image spectrum including a range spectrum, a Doppler spectrum, a direction of arrival spectrum, or any combination thereof. In some examples, the target information manager 735 may be configured as or otherwise support a means for associating a set of radar image coordinates of the radar image spectrum with the target object based on the trajectory and the second radar spectrum.

In some examples, the target information manager 735 may be configured as or otherwise support a means for determining a second set of motion parameters for the target object in the field of view of the second radar component based on the second radar waveform and the set of radar image components.

In some examples, to support determining the trajectory of the target object, the image spectrum manager 740 may be configured as or otherwise support a means for generating a radar image spectrum based on the first radar waveform, the radar image spectrum including a range spectrum, a Doppler spectrum, a direction of arrival spectrum, or any combination thereof. In some examples, to support determining the trajectory of the target object, the image data component 745 may be configured as or otherwise support a means for determining a set of radar image coordinates of the radar image spectrum based on the first radar waveform and the radar image spectrum. In some examples, to support determining the trajectory of the target object, the target information manager 735 may be configured as or otherwise support a means for determining the set of motion parameters for the target object based on the set of radar image coordinates, the set of motion parameters including a velocity of the target object, a direction of arrival of the target object, a range of the target object, or a combination thereof.

In some examples, to support determining the trajectory of the target object, the trajectory manager 730 may be configured as or otherwise support a means for determining the trajectory based on a set of tracking data for the target object, where the set of tracking data is based on one or more previous radar waveforms received at the first radar component.

In some examples, the radar detection component 725 may be configured as or otherwise support a means for receiving a third radar waveform in the field of view of the first radar component. In some examples, the image data component 745 may be configured as or otherwise support a means for determining a second set of radar image coordinates of the radar image spectrum based on the third radar waveform and the radar image spectrum, where the trajectory is determined based on the first and second sets of radar image coordinates.

In some examples, the database manager 750 may be configured as or otherwise support a means for storing measurements associated with the first radar waveform on a database associated with the vehicle UE. In some examples, the database manager 750 may be configured as or otherwise support a means for accessing, by the second radar component, the measurements on the database, where the second radar waveform is associated with the target object based on the accessed measurements.

In some examples, the radar ranging component 755 may be configured as or otherwise support a means for transmitting, by the first radar component of the vehicle UE, a first frequency modulated continuous wave, where the first radar waveform includes the first frequency modulated continuous wave reflected by the target object. In some examples, the radar ranging component 755 may be configured as or otherwise support a means for transmitting, by the second radar component of the vehicle UE, a second frequency modulated continuous wave, where the second radar waveform includes the second frequency modulated continuous wave reflected by the target object.

In some examples, each of the first frequency modulated continuous wave and the second frequency modulated continuous wave are associated with a set of radar transmission parameters.

In some examples, the set of radar transmission parameters includes a slope, a start frequency, a time offset, a chirp duration, a frequency offset, a number of frequency chirps, or any combination thereof.

In some examples, the image data component 745 may be configured as or otherwise support a means for predicting a set of coordinates corresponding to the target object entering the field of view of the second radar component based on the trajectory. In some examples, the image data component 745 may be configured as or otherwise support a means for determining a set of uncertainty measurements associated with the set of coordinates, where the second radar waveform is associated with the target object based on the set of uncertainty measurements.

In some examples, each of the first radar waveform and the second radar waveform includes a frequency modulated continuous wave.

In some examples, the trajectory indicates a set of future motion parameters associated with the target object.

Figure 8:
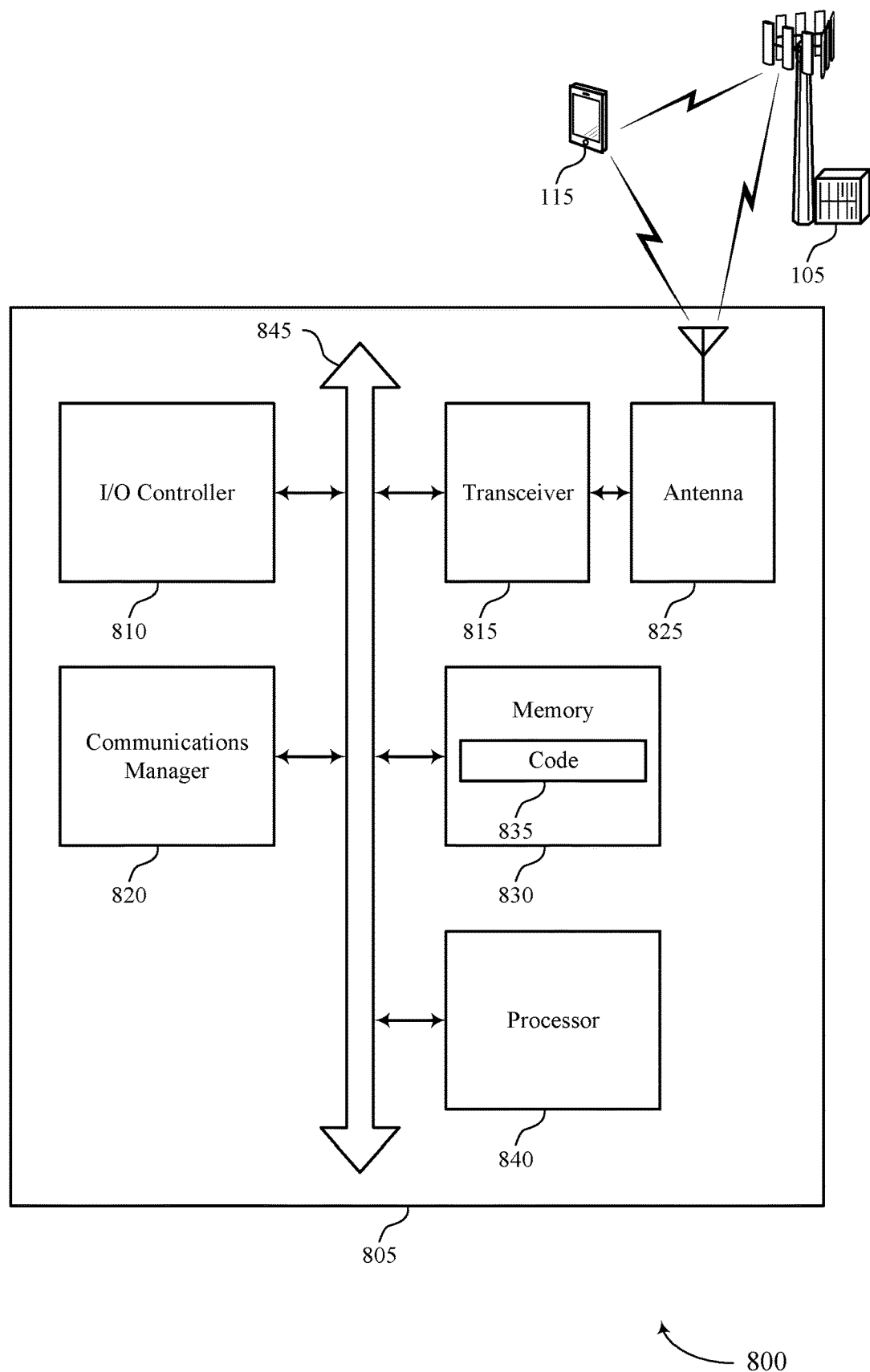
FIG. 8 shows a diagram of a system including a device that supports intra-vehicle radar handover in accordance with aspects of the present disclosure.

FIG. 8 shows a diagram of a system 800 including a device 805 that supports intra-vehicle radar handover in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting intra-vehicle radar handover). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for receiving, at a first radar component of the vehicle UE, a first radar waveform in a field of view of the first radar component, where the first radar waveform indicates a set of motion parameters for a target object. The communications manager 820 may be configured as or otherwise support a means for determining a trajectory of the target object based on the set of motion parameters for the target object and the target object exiting the field of view of the first radar component, where the trajectory indicates the target object entering a field of view of a second radar component of the vehicle UE. The communications manager 820 may be configured as or otherwise support a means for receiving, at the second radar component of the vehicle UE, a second radar waveform in the field of view of the second radar component. The communications manager 820 may be configured as or otherwise support a means for associating the second radar waveform with the target object based on the trajectory of the target object and the second radar waveform being in the field of view of the second radar component.

By including or configuring the communications manager 820 in accordance with examples as described herein, the device 805 may support techniques for improved user experience related to safety provided by accurate target detection, and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of intra-vehicle radar handover as described herein, or the processor 840 and the memory 830 may be otherwise configured to perform or support such operations.

Figure 9:
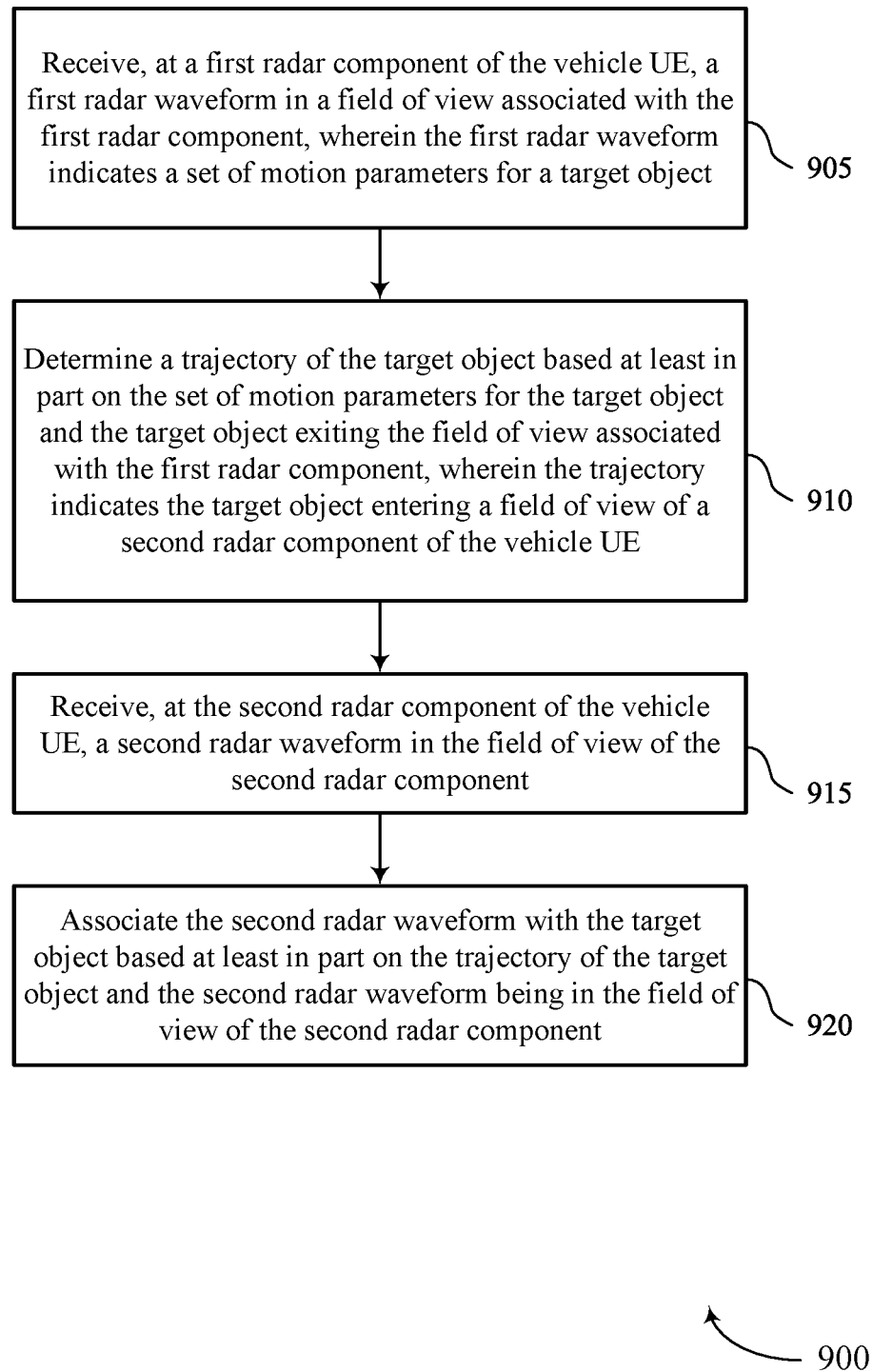
FIGS. 9 through 12 show flowcharts illustrating methods that support intra-vehicle radar handover in accordance with aspects of the present disclosure.

FIG. 9 shows a flowchart illustrating a method 900 that supports intra-vehicle radar handover in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions.

Additionally or alternatively, the UE may perform aspects of the described functions using special-purpose hardware.

At 905, the method may include receiving, at a first radar component of the vehicle UE, a first radar waveform in a field of view of the first radar component, where the first radar waveform indicates a set of motion parameters for a target object. The operations of 905 may be performed in accordance with examples as disclosed herein. In some examples, aspects of the operations of 905 may be performed by a radar detection component 725 as described with reference to FIG. 7.

At 910, the method may include determining a trajectory of the target object based on the set of motion parameters for the target object and the target object exiting the field of view of the first radar component, where the trajectory indicates the target object entering a field of view of a second radar component of the vehicle UE. The operations of 910 may be performed in accordance with examples as disclosed herein. In some examples, aspects of the operations of 910 may be performed by a trajectory manager 730 as described with reference to FIG. 7.

At 915, the method may include receiving, at the second radar component of the vehicle UE, a second radar waveform in the field of view of the second radar component. The operations of 915 may be performed in accordance with examples as disclosed herein. In some examples, aspects of the operations of 915 may be performed by a radar detection component 725 as described with reference to FIG. 7.

At 920, the method may include associating the second radar waveform with the target object based on the trajectory of the target object and the second radar waveform being in the field of view of the second radar component. The operations of 920 may be performed in accordance with examples as disclosed herein. In some examples, aspects of the operations of 920 may be performed by a target information manager 735 as described with reference to FIG. 7.

Figure 10:
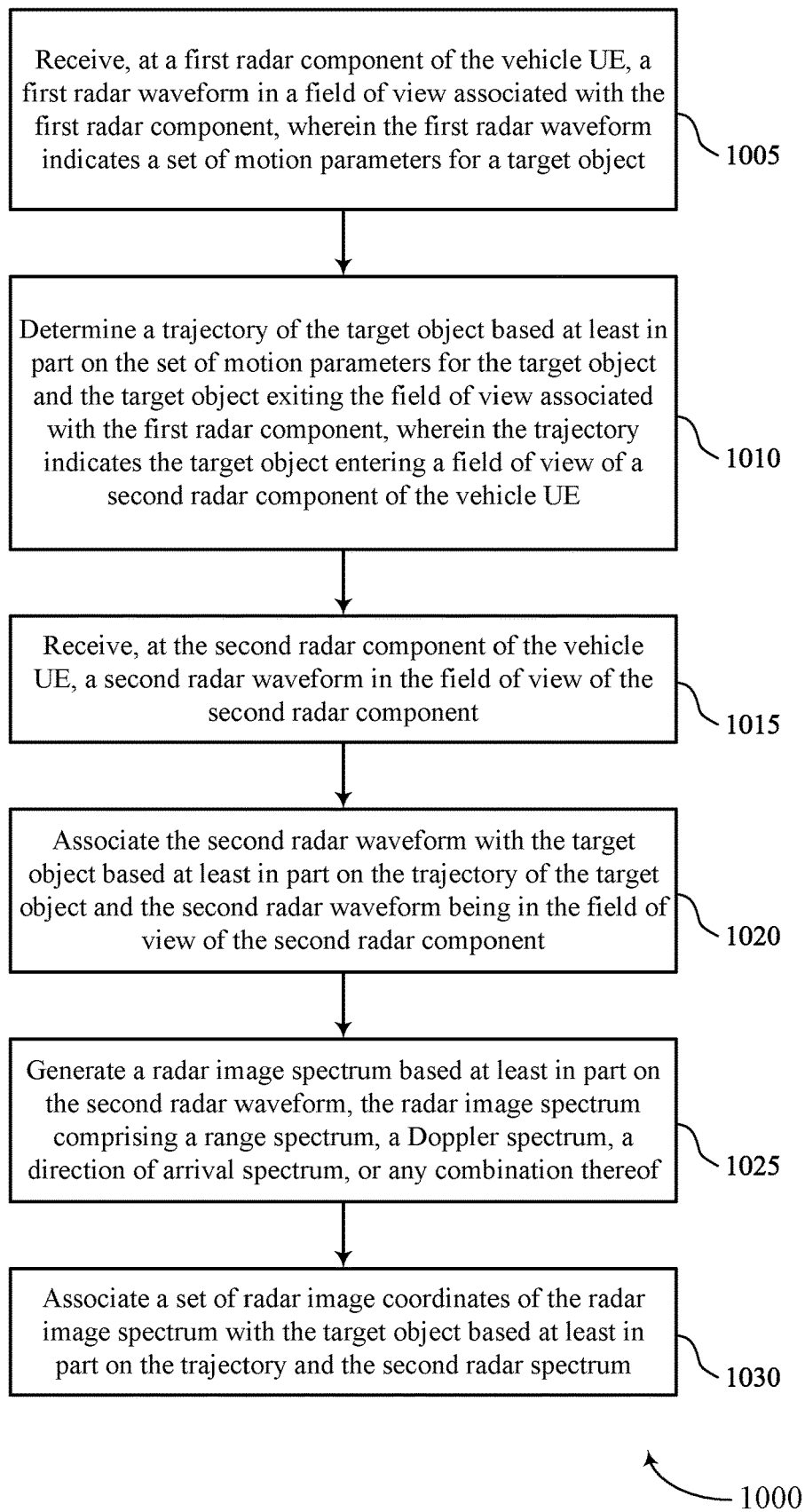

FIG. 10 shows a flowchart illustrating a method 1000 that supports intra-vehicle radar handover in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, at a first radar component of the vehicle UE, a first radar waveform in a field of view of the first radar component, where the first radar waveform indicates a set of motion parameters for a target object. The operations of 1005 may be performed in accordance with examples as disclosed herein. In some examples, aspects of the operations of 1005 may be performed by a radar detection component 725 as described with reference to FIG. 7.

At 1010, the method may include determining a trajectory of the target object based on the set of motion parameters for the target object and the target object exiting the field of view of the first radar component, where the trajectory indicates the target object entering a field of view of a second radar component of the vehicle UE. The operations of 1010 may be performed in accordance with examples as disclosed herein. In some examples, aspects of the operations of 1010 may be performed by a trajectory manager 730 as described with reference to FIG. 7.

At 1015, the method may include receiving, at the second radar component of the vehicle UE, a second radar waveform in the field of view of the second radar component. The operations of 1015 may be performed in accordance with examples as disclosed herein. In some examples, aspects of the operations of 1015 may be performed by a radar detection component 725 as described with reference to FIG. 7.

At 1020, the method may include associating the second radar waveform with the target object based on the trajectory of the target object and the second radar waveform being in the field of view of the second radar component. The operations of 1020 may be performed in accordance with examples as disclosed herein. In some examples, aspects of the operations of 1020 may be performed by a target information manager 735 as described with reference to FIG. 7.

At 1025, the method may include generating a radar image spectrum based on the second radar waveform, the radar image spectrum including a range spectrum, a Doppler spectrum, a direction of arrival spectrum, or any combination thereof. The operations of 1025 may be performed in accordance with examples as disclosed herein. In some examples, aspects of the operations of 1025 may be performed by an image spectrum manager 740 as described with reference to FIG. 7.

At 1030, the method may include associating a set of radar image coordinates of the radar image spectrum with the target object based on the trajectory and the second radar spectrum. The operations of 1030 may be performed in accordance with examples as disclosed herein. In some examples, aspects of the operations of 1030 may be performed by a target information manager 735 as described with reference to FIG. 7.

Figure 11:
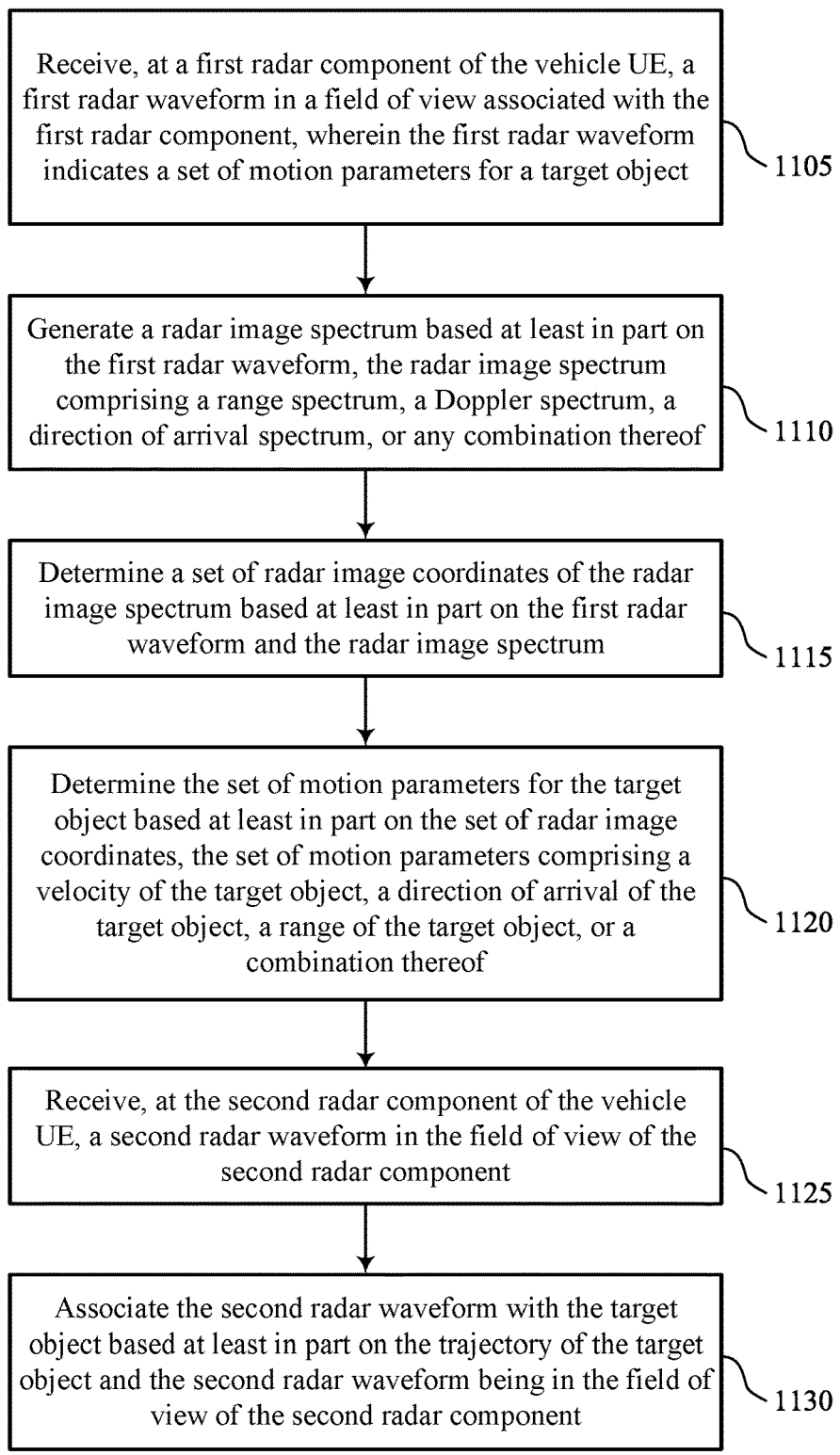

FIG. 11 shows a flowchart illustrating a method 1100 that supports intra-vehicle radar handover in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, at a first radar component of the vehicle UE, a first radar waveform in a field of view of the first radar component, where the first radar waveform indicates a set of motion parameters for a target object. The operations of 1105 may be performed in accordance with examples as disclosed herein. In some examples, aspects of the operations of 1105 may be performed by a radar detection component 725 as described with reference to FIG. 7.

At 1110, the method may include generating a radar image spectrum based on the first radar waveform, the radar image spectrum including a range spectrum, a Doppler spectrum, a direction of arrival spectrum, or any combination thereof. The operations of 1110 may be performed in accordance with examples as disclosed herein. In some examples, aspects of the operations of 1110 may be performed by an image spectrum manager 740 as described with reference to FIG. 7.

At 1115, the method may include determining a set of radar image coordinates of the radar image spectrum based on the first radar waveform and the radar image spectrum. The operations of 1115 may be performed in accordance with examples as disclosed herein. In some examples, aspects of the operations of 1115 may be performed by an image data component 745 as described with reference to FIG. 7.

At 1120, the method may include determining the set of motion parameters for the target object based on the set of radar image coordinates, the set of motion parameters including a velocity of the target object, a direction of arrival of the target object, a range of the target object, or a combination thereof. The operations of 1120 may be performed in accordance with examples as disclosed herein. In some examples, aspects of the operations of 1120 may be performed by a target information manager 735 as described with reference to FIG. 7.

At 1125, the method may include receiving, at the second radar component of the vehicle UE, a second radar waveform in the field of view of the second radar component. The operations of 1125 may be performed in accordance with examples as disclosed herein. In some examples, aspects of the operations of 1125 may be performed by a radar detection component 725 as described with reference to FIG. 7.

At 1130, the method may include associating the second radar waveform with the target object based on the trajectory of the target object and the second radar waveform being in the field of view of the second radar component. The operations of 1130 may be performed in accordance with examples as disclosed herein. In some examples, aspects of the operations of 1130 may be performed by a target information manager 735 as described with reference to FIG. 7.

Figure 12:
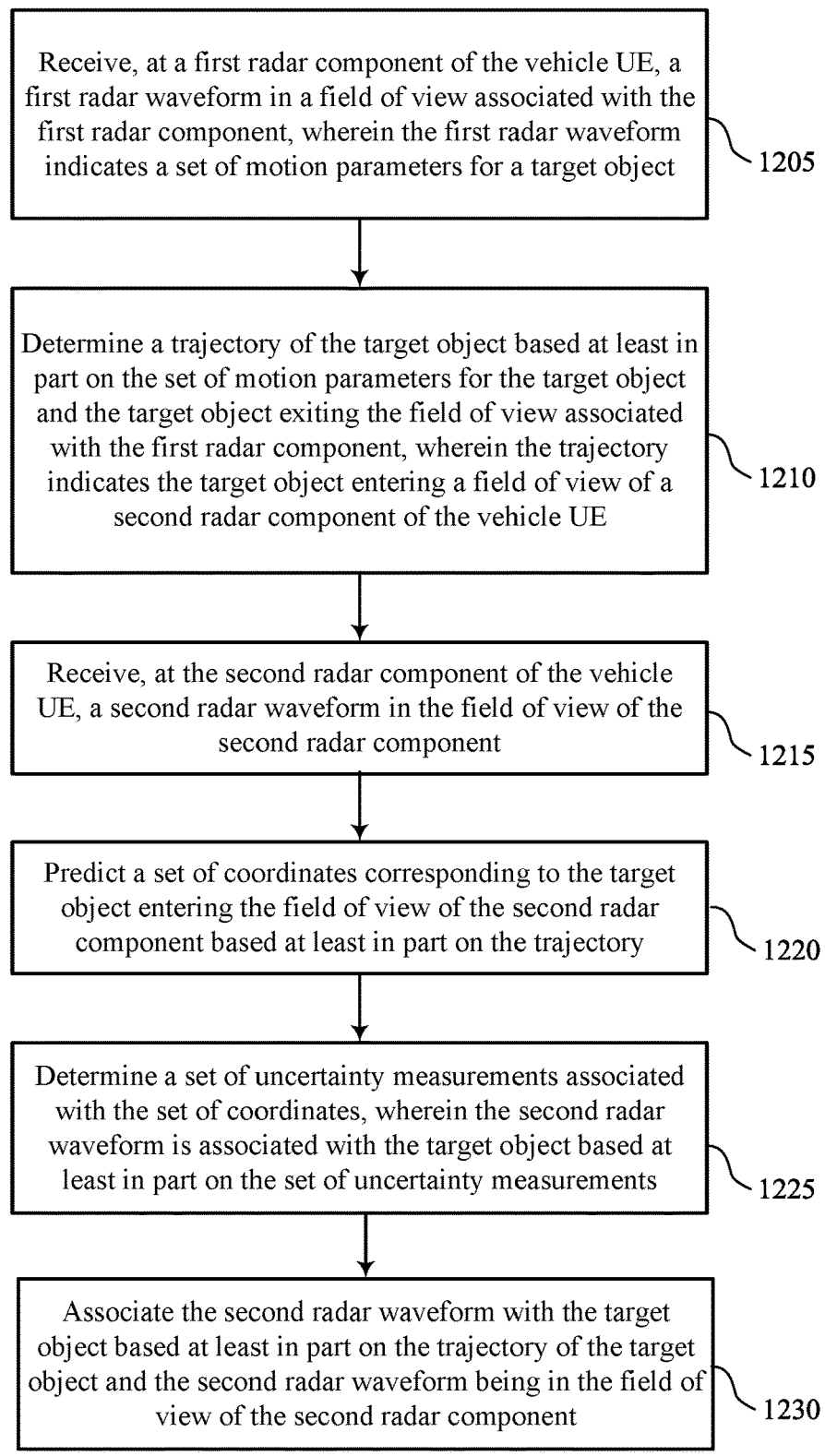

FIG. 12 shows a flowchart illustrating a method 1200 that supports intra-vehicle radar handover in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, at a first radar component of the vehicle UE, a first radar waveform in a field of view of the first radar component, where the first radar waveform indicates a set of motion parameters for a target object. The operations of 1205 may be performed in accordance with examples as disclosed herein. In some examples, aspects of the operations of 1205 may be performed by a radar detection component 725 as described with reference to FIG. 7.

At 1210, the method may include determining a trajectory of the target object based on the set of motion parameters for the target object and the target object exiting the field of view of the first radar component, where the trajectory indicates the target object entering a field of view of a second radar component of the vehicle UE. The operations of 1210 may be performed in accordance with examples as disclosed herein. In some examples, aspects of the operations of 1210 may be performed by a trajectory manager 730 as described with reference to FIG. 7.

At 1215, the method may include receiving, at the second radar component of the vehicle UE, a second radar waveform in the field of view of the second radar component. The operations of 1215 may be performed in accordance with examples as disclosed herein. In some examples, aspects of the operations of 1215 may be performed by a radar detection component 725 as described with reference to FIG. 7.

At 1220, the method may include predicting a set of coordinates corresponding to the target object entering the field of view of the second radar component based on the trajectory. The operations of 1220 may be performed in accordance with examples as disclosed herein. In some examples, aspects of the operations of 1220 may be performed by an image data component 745 as described with reference to FIG. 7.

At 1225, the method may include determining a set of uncertainty measurements associated with the set of coordinates, where the second radar waveform is associated with the target object based on the set of uncertainty measurements. The operations of 1225 may be performed in accordance with examples as disclosed herein. In some examples, aspects of the operations of 1225 may be performed by an image data component 745 as described with reference to FIG. 7.

At 1230, the method may include associating the second radar waveform with the target object based on the trajectory of the target object and the second radar waveform being in the field of view of the second radar component. The operations of 1230 may be performed in accordance with examples as disclosed herein. In some examples, aspects of the operations of 1230 may be performed by a target information manager 735 as described with reference to FIG. 7.

The following provides an overview of aspects of the present disclosure:

Aspect 1: A method of wireless communications at a vehicle UE, comprising: receiving, at a first radar component of the vehicle UE, a first radar waveform in a field of view of the first radar component, wherein the first radar waveform indicates a set of motion parameters for a target object; determining a trajectory of the target object based at least in part on the set of motion parameters for the target object and the target object exiting the field of view of the first radar component, wherein the trajectory indicates the target object entering a field of view of a second radar component of the vehicle UE; receiving, by the second radar component of the vehicle UE, a second radar waveform in the field of view of the second radar component; and associating the second radar waveform with the target object based at least in part on the trajectory of the target object and the second radar waveform being in the field of view of the second radar component.

Aspect 2: The method of aspect 1, further comprising: generating a radar image spectrum based at least in part on the second radar waveform, the radar image spectrum comprising a range spectrum, a Doppler spectrum, a direction of arrival spectrum, or any combination thereof, and associating a set of radar image coordinates of the radar image spectrum with the target object based at least in part on the trajectory and the second radar spectrum.

Aspect 3: The method of aspect 2, further comprising: determining a second set of motion parameters for the target object in the field of view of the second radar component based at least in part on the second radar waveform and the set of radar image components.

Aspect 4: The method of any of aspects 1 through 3, wherein determining the trajectory of the target object comprises: generating a radar image spectrum based at least in part on the first radar waveform, the radar image spectrum comprising a range spectrum, a Doppler spectrum, a direction of arrival spectrum, or any combination thereof; determining a set of radar image coordinates of the radar image spectrum based at least in part on the first radar waveform and the radar image spectrum; and determining the set of motion parameters for the target object based at least in part on the set of radar image coordinates, the set of motion parameters comprising a velocity of the target object, a direction of arrival of the target object, a range of the target object, or a combination thereof.

Aspect 5: The method of aspect 4, wherein determining the trajectory of the target object comprises: determining the trajectory based at least in part on a set of tracking data for the target object, wherein the set of tracking data is based at least in part on one or more previous radar waveforms received at the first radar component.

Aspect 6: The method of any of aspects 4 through 5, further comprising: receiving a third radar waveform in the field of view of the first radar component; and determining a second set of radar image coordinates of the radar image spectrum based at least in part on the third radar waveform and the radar image spectrum, wherein the trajectory is determined based at least in part on the first and second sets of radar image coordinates.

Aspect 7: The method of any of aspects 1 through 6, further comprising: storing measurements associated with the first radar waveform on a database associated with the vehicle UE; and accessing, by the second radar component, the measurements on the database, wherein the second radar waveform is associated with the target object based at least in part on the accessed measurements.

Aspect 8: The method of any of aspects 1 through 7, further comprising: transmitting, by the first radar component of the vehicle UE, a first frequency modulated continuous wave, wherein the first radar waveform comprises the first frequency modulated continuous wave reflected by the target object; and transmitting, by the second radar component of the vehicle UE, a second frequency modulated continuous wave, wherein the second radar waveform comprises the second frequency modulated continuous wave reflected by the target object.

Aspect 9: The method of aspect 8, wherein each of the first frequency modulated continuous wave and the second frequency modulated continuous wave are associated with a set of radar transmission parameters.

Aspect 10: The method of aspect 9, wherein the set of radar transmission parameters comprises a slope, a start frequency, a time offset, a chirp duration, a frequency offset, a number of frequency chirps, or any combination thereof.

Aspect 11: The method of any of aspects 1 through 10, further comprising: predicting a set of coordinates corresponding to the target object entering the field of view of the second radar component based at least in part on the trajectory; and determining a set of uncertainty measurements associated with the set of coordinates, wherein the second radar waveform is associated with the target object based at least in part on the set of uncertainty measurements.

Aspect 12: The method of any of aspects 1 through 11, wherein each of the first radar waveform and the second radar waveform comprises a frequency modulated continuous wave.

Aspect 13: The method of any of aspects 1 through 12, wherein the trajectory indicates a set of future motion parameters associated with the target object.

Aspect 14: An apparatus comprising a processor; memory coupled with the processor; and instructions stored in the memory and executable by the processor to cause the apparatus to perform a method of any of aspects 1 through 13.

Aspect 15: An apparatus comprising at least one means for performing a method of any of aspects 1 through 13.

Aspect 16: A non-transitory computer-readable medium storing code the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communications at a vehicle user equipment (UE), comprising:
   receiving, at a first radar component of the vehicle UE, a first radar waveform in a field of view of the first radar component, wherein the first radar waveform indicates a set of motion parameters for a target vehicle UE;
   determining a trajectory of the target vehicle UE based at least in part on the set of motion parameters for the target vehicle UE, one or more previous radar waveforms received at the first radar component, and the target vehicle UE exiting the field of view of the first radar component, wherein the trajectory indicates the target vehicle UE is to exit the field of view of the first radar component of the vehicle UE and, after being out of range of the first radar component, is to enter a field of view of a second radar component of the vehicle UE different than the first radar component at a time of entry and at a set of coordinates, and wherein the trajectory indicates that the target vehicle UE is to enter the second radar component with a velocity of entry;
   storing information associated with the set of motion parameters for the target vehicle UE and the trajectory of the target vehicle UE on a database associated with the vehicle UE;
   receiving, at the second radar component of the vehicle UE, a second radar waveform in the field of view of the second radar component;
   accessing, by the second radar component, the stored information associated with the set of motion parameters for the target vehicle UE, the stored trajectory of the target vehicle UE, or both on the database based at least in part on receiving the second radar waveform in the field of view of the second radar component; and
   associating the second radar waveform with the target vehicle UE based at least in part on accessing the stored information, the stored trajectory, or both of the target vehicle UE.

2. The method of claim 1, further comprising:
   generating a radar image spectrum based at least in part on the second radar waveform, the radar image spectrum comprising a range spectrum, a Doppler spectrum, a direction of arrival spectrum, or any combination thereof; and
   associating a set of radar image coordinates of the radar image spectrum with the target vehicle UE based at least in part on the trajectory and the second radar waveform.

3. The method of claim 2, further comprising:
   determining a second set of motion parameters for the target vehicle UE in the field of view of the second radar component based at least in part on the second radar waveform and the set of radar image coordinates.

4. The method of claim 1, wherein determining the trajectory of the target vehicle UE comprises:
   generating a radar image spectrum based at least in part on the first radar waveform, the radar image spectrum comprising a range spectrum, a Doppler spectrum, a direction of arrival spectrum, or any combination thereof;

determining a first set of radar image coordinates of the radar image spectrum based at least in part on the first radar waveform and the radar image spectrum; and determining the set of motion parameters for the target vehicle UE based at least in part on the first set of radar image coordinates, the set of motion parameters comprising a velocity of the target vehicle UE, a direction of arrival of the target vehicle UE, a range of the target vehicle UE, or any combination thereof.

5. The method of claim 4, further comprising:
receiving a third radar waveform in the field of view of the first radar component; and
determining a second set of radar image coordinates of the radar image spectrum based at least in part on the third radar waveform and the radar image spectrum, wherein the trajectory is determined based at least in part on the first set of radar image coordinates and the second set of radar image coordinates.

6. The method of claim 1, further comprising:
transmitting, by the first radar component of the vehicle UE, a first frequency modulated continuous wave, wherein the first radar waveform comprises the first frequency modulated continuous wave reflected by the target vehicle UE; and
transmitting, by the second radar component of the vehicle UE, a second frequency modulated continuous wave, wherein the second radar waveform comprises the second frequency modulated continuous wave reflected by the target vehicle UE.

7. The method of claim 6, wherein each of the first frequency modulated continuous wave and the second frequency modulated continuous wave are associated with a set of radar transmission parameters.

8. The method of claim 7, wherein the set of radar transmission parameters comprises a slope, a start frequency, a time offset, a chirp duration, a frequency offset, a number of frequency chirps, or any combination thereof.

9. The method of claim 1, further comprising:
predicting the set of coordinates corresponding to the target vehicle UE entering the field of view of the second radar component based at least in part on the trajectory; and
determining a set of uncertainty measurements associated with the set of coordinates, wherein the second radar waveform is associated with the target vehicle UE based at least in part on the set of uncertainty measurements.

10. The method of claim 1, wherein each of the first radar waveform and the second radar waveform comprises a frequency modulated continuous wave.

11. The method of claim 1, wherein the trajectory indicates a set of future motion parameters associated with the target vehicle UE.

12. An apparatus at a vehicle user equipment (UE), comprising:
at least one processor;
memory coupled with the at least one processor; and
instructions stored in the memory and executable by the at least one processor to cause the apparatus to:
receive, at a first radar component of the vehicle UE, a first radar waveform in a field of view of the first radar component, wherein the first radar waveform indicates a set of motion parameters for a target vehicle UE;

determine a trajectory of the target vehicle UE based at least in part on the set of motion parameters for the target vehicle UE, one or more previous radar waveforms received at the first radar component, and the target vehicle UE exiting the field of view of the first radar component, wherein the trajectory indicates the target vehicle UE is to exit the field of view of the first radar component of the vehicle UE and, after being out of range of the first radar component, is to enter a field of view of a second radar component of the vehicle UE different than the first radar component at a time of entry and at a set of coordinates, and wherein the trajectory indicates that the target vehicle UE is to enter the second radar component with a velocity of entry;

store information associated with the set of motion parameters for the target vehicle UE and the trajectory of the target vehicle UE on a database associated with the vehicle UE;

receive, at the second radar component of the vehicle UE, a second radar waveform in the field of view of the second radar component;

access, by the second radar component, the stored information associated with the set of motion parameters for the target vehicle UE, the stored trajectory of the target vehicle UE, or both on the database based at least in part on receiving the second radar waveform in the field of view of the second radar component; and associate the second radar waveform with the target vehicle UE based at least in part on access of the stored information, the stored trajectory, or both of the target vehicle UE.

13. The apparatus of claim 12, wherein the instructions are further executable by the at least one processor to cause the apparatus to:
generate a radar image spectrum based at least in part on the second radar waveform, the radar image spectrum comprising a range spectrum, a Doppler spectrum, a direction of arrival spectrum, or any combination thereof; and associate a set of radar image coordinates of the radar image spectrum with the target vehicle UE based at least in part on the trajectory and the second radar waveform.

14. The apparatus of claim 13, wherein the instructions are further executable by the at least one processor to cause the apparatus to:
determine a second set of motion parameters for the target vehicle UE in the field of view of the second radar component based at least in part on the second radar waveform and the set of radar image coordinates.

15. The apparatus of claim 12, wherein the instructions to determine the trajectory of the target vehicle UE are executable by the at least one processor to cause the apparatus to:
generate a radar image spectrum based at least in part on the first radar waveform, the radar image spectrum comprising a range spectrum, a Doppler spectrum, a direction of arrival spectrum, or any combination thereof;

determine a first set of radar image coordinates of the radar image spectrum based at least in part on the first radar waveform and the radar image spectrum; and determine the set of motion parameters for the target vehicle UE based at least in part on the first set of radar image coordinates, the set of motion parameters comprising a velocity of the target vehicle UE, a direction of arrival of the target vehicle UE, a range of the target vehicle UE, or any combination thereof.

16. The apparatus of claim 15, wherein the instructions are further executable by the at least one processor to cause the apparatus to:
  receive a third radar waveform in the field of view of the first radar component; and
  determine a second set of radar image coordinates of the radar image spectrum based at least in part on the third radar waveform and the radar image spectrum, wherein the trajectory is determined based at least in part on the first set of radar image coordinates and the second set of radar image coordinates.

17. The apparatus of claim 12, wherein the instructions are further executable by the at least one processor to cause the apparatus to:
  transmit, by the first radar component of the vehicle UE, a first frequency modulated continuous wave, wherein the first radar waveform comprises the first frequency modulated continuous wave reflected by the target vehicle UE; and
  transmit, by the second radar component of the vehicle UE, a second frequency modulated continuous wave, wherein the second radar waveform comprises the second frequency modulated continuous wave reflected by the target vehicle UE.

18. The apparatus of claim 17, wherein each of the first frequency modulated continuous wave and the second frequency modulated continuous wave are associated with a set of radar transmission parameters.

19. The apparatus of claim 18, wherein the set of radar transmission parameters comprises a slope, a start frequency, a time offset, a chirp duration, a frequency offset, a quantity of frequency chirps, or any combination thereof.

20. The apparatus of claim 12, wherein the instructions are further executable by the at least one processor to cause the apparatus to:
  predict the set of coordinates corresponding to the target vehicle UE entering the field of view of the second radar component based at least in part on the trajectory; and
  determine a set of uncertainty measurements associated with the set of coordinates, wherein the second radar waveform is associated with the target vehicle UE based at least in part on the set of uncertainty measurements.

21. The apparatus of claim 12, wherein each of the first radar waveform and the second radar waveform comprises a frequency modulated continuous wave.

22. The apparatus of claim 12, wherein the trajectory indicates a set of future motion parameters associated with the target vehicle UE.

23. An apparatus at a vehicle user equipment (UE), comprising:
  means for receiving, at a first radar component of the vehicle UE, a first radar waveform in a field of view of the first radar component, wherein the first radar waveform indicates a set of motion parameters for a target vehicle UE;
  means for determining a trajectory of the target vehicle UE based at least in part on the set of motion parameters for the target vehicle UE, one or more previous radar waveforms received at the first radar component, and the target vehicle UE exiting the field of view of the first radar component, wherein the trajectory indicates the target vehicle UE is to exit the field of view of the first radar component of the vehicle UE and, after being out of range of the first radar component, is to enter a field of view of a second radar component of the vehicle UE different than the first radar component at a time of entry and at a set of coordinates, and wherein the trajectory indicates that the target vehicle UE is to enter the second radar component with a velocity of entry;
  means for storing information associated with the set of motion parameters for the target vehicle UE and the trajectory of the target vehicle UE on a database associated with the vehicle UE;
  means for receiving, at the second radar component of the vehicle UE, a second radar waveform in the field of view of the second radar component; means for accessing, by the second radar component, the stored information associated with the set of motion parameters for the target vehicle UE, the stored trajectory of the target vehicle UE, or both on the database based at least in part on receiving the second radar waveform in the field of view of the second radar component; and
  means for associating the second radar waveform with the target vehicle UE based at least in part on access of the stored information, the stored trajectory, or both of the target vehicle UE.

24. The apparatus of claim 23, further comprising:
  means for generating a radar image spectrum based at least in part on the second radar waveform, the radar image spectrum comprising a range spectrum, a Doppler spectrum, a direction of arrival spectrum, or any combination thereof; and
  means for associating a set of radar image coordinates of the radar image spectrum with the target vehicle UE based at least in part on the trajectory and the second radar waveform.

25. The apparatus of claim 24, further comprising:
  means for determining a second set of motion parameters for the target vehicle UE in the field of view of the second radar component based at least in part on the second radar waveform and the set of radar image coordinates.

26. A non-transitory computer-readable medium storing code at a vehicle user equipment (UE), the code comprising instructions executable by a processor to:
  receive, at a first radar component of the vehicle UE, a first radar waveform in a field of view of the first radar component, wherein the first radar waveform indicates a set of motion parameters for a target vehicle UE;
  determine a trajectory of the target vehicle UE based at least in part on the set of motion parameters for the target vehicle UE, one or more previous radar waveforms received at the first radar component, and the target vehicle UE exiting the field of view of the first radar component, wherein the trajectory indicates the target vehicle UE is to exit the field of view of the first radar component of the vehicle UE and, after being out of range of the first radar component, is to enter a field of view of a second radar component of the vehicle UE different than the first radar component at a time of entry and at a set of coordinates, and wherein the trajectory indicates that the target vehicle UE is to enter the second radar component with a velocity of entry;
  store information associated with the set of motion parameters for the target vehicle UE and the trajectory of the target vehicle UE on a database associated with the vehicle UE;

receive, at the second radar component of the vehicle UE, a second radar waveform in the field of view of the second radar component;

access, by the second radar component, the stored information associated with the set of motion parameters for the target vehicle UE, the stored trajectory of the target vehicle UE, or both on the database based at least in part on receiving the second radar waveform in the field of view of the second radar component; and associate the second radar waveform with the target vehicle UE based at least in part on access of the stored information, the stored trajectory, or both of the target vehicle UE.

* * * * *